(12) United States Patent
Lebrat

(10) Patent No.: US 7,599,927 B2
(45) Date of Patent: Oct. 6, 2009

(54) METHOD FOR SEARCHING CONTENT PARTICULARLY FOR EXTRACTS COMMON TO TWO COMPUTER FILES

(75) Inventor: François Lebrat, Paris (FR)

(73) Assignee: Francois Lebrat & TDF, Paris (FR)

( * ) Notice: Subject to any disclaimer, the term of this patent is extended or adjusted under 35 U.S.C. 154(b) by 288 days.

(21) Appl. No.: 10/599,655

(22) PCT Filed: Mar. 18, 2005

(86) PCT No.: PCT/FR2005/000673

§ 371 (c)(1),
(2), (4) Date: Jul. 17, 2007

(87) PCT Pub. No.: WO2005/101292

PCT Pub. Date: Oct. 27, 2005

(65) Prior Publication Data

US 2007/0271253 A1 Nov. 22, 2007

(30) Foreign Application Priority Data

Apr. 5, 2004 (FR) .................................. 04 03556

(51) Int. Cl.
G06F 7/00 (2006.01)

(52) U.S. Cl. ...................... 707/5; 707/1; 707/3; 707/6; 707/9; 707/10; 707/100; 707/101; 380/200; 380/201; 380/202; 380/203; 380/252; 380/253; 380/254; 380/277; 380/282; 381/73.1; 382/276; 382/278

(58) Field of Classification Search ...................... 707/1, 707/3, 5, 6, 9, 10, 100, 101; 380/200, 201, 380/202, 203, 252, 253, 254, 277, 282; 381/73.1; 382/276, 278

See application file for complete search history.

(56) References Cited

U.S. PATENT DOCUMENTS 5,809,139 A * 9/1998 Girod et al. ................. 380/202
5,825,892 A * 10/1998 Braudaway et al. ........... 380/51
5,935,247 A * 8/1999 Pai et al. ....................... 726/29
6,674,861 B1 * 1/2004 Xu et al. ...................... 380/252
6,738,744 B2 * 5/2004 Kirovski et al. ............. 704/273

OTHER PUBLICATIONS

Snasel V., "Fussy Signatures for Multimedia Databases", Advances in Information Systems First International Conference, ADVIS 2000 Proceedings (Lecture Notes in Computer Science vol. 1909), pp. 257-264 (2000).
S Harber et al , "If Piracy is the Problem, Is DRM the Answer?", Digital Rights Management Technolgoical, Economic, Legal and Political Aspects, pp. 224-233, (Aug. 31, 2003).
Faloutsos C., "Access Method for Text", ACM Computing Surveys, vol. 17, No. 1, pp. 49-74, (Mar. 1985).
International Search Report PCT/FR2005/000673; report dated Nov. 14, 2005.

* cited by examiner

Primary Examiner—Etienne P LeRoux
Assistant Examiner—Bruce A Witzenburg
(74) Attorney, Agent, or Firm—Miller, Matthias & Hull

(57) ABSTRACT

The present invention relates to searching content, particularly for at least one extract common to a first data file and a second data file. The method comprises a preliminary step of preparing at least the first file by (a) dividing the first file into a series of data packets having a predetermined size, and identifying packet addresses in said file, (b) combining each packet address with a digital signature that defines one of three fuzzy logic states, namely true, false and indeterminate, and is the result of a combinatorial computation on data from said file; whereafter said method comprises performing an actual search for a common extract by (c) comparing the fuzzy logic states combined with each packet address of the first file with fuzzy logic states determined on the basis of data from the second file, and (d) removing from said common extract search the respective address pairs from the first and second files that have the respective logic states true and false or false and true, and retaining the other address pairs that identify data packets that may comprise said common extract.

30 Claims, 17 Drawing Sheets

| Characters | L | a |  | t | o | r | t | u | e |
|---|---|---|---|---|---|---|---|---|---|
| Integer number of the ASCII code | 76 | 97 | 32 | 116 | 111 | 114 | 116 | 117 | 101 |
| Addresses of the data | 0 | 1 | 2 | 3 | 4 | 5 | 6 | 7 | 8 |
| Binary states | 0 | 0 | 0 | 1 | 1 | 1 | 1 | 1 | 0 |
| Fuzzy states (index ratio of 2) | 0 | ? |  | 1 |  | 1 |  |  | 0 |
| Fuzzy states with an index ratio of 3 | 0 |  | 1 |  |  |  | ? |  |  |
| Fuzzy states with an index ratio of 4 | ? |  |  |  | 1 |  |  |  | 0 |

| Logical OR | 0 | 1 |
|---|---|---|
| 0 | 0 | 1 |
| 1 | 1 | 1 |

FIG. 5A

| Logical AND | 0 | 1 |
|---|---|---|
| 0 | 0 | 0 |
| 1 | 0 | 1 |

FIG. 5B

|  | B0 | B1 |
|---|---|---|
| 0 | 1 | 0 |
| 1 | 0 | 1 |
| ? | 1 | 1 |
| X | 0 | 0 |

FIG. 5C

| Logical OR | 0 | 1 | ? | X |
|---|---|---|---|---|
| 0 | 0 | ? | ? | 0 |
| 1 | ? | 1 | ? | 1 |
| ? | ? | ? | ? | ? |
| X | 0 | 1 | ? | X |

FIG. 5D

| Logical AND | 0 | 1 | ? | X |
|---|---|---|---|---|
| 0 | 0 | X | 0 | X |
| 1 | X | 1 | 1 | X |
| ? | 0 | 1 | ? | X |
| X | X | X | X | X |

FIG. 5E

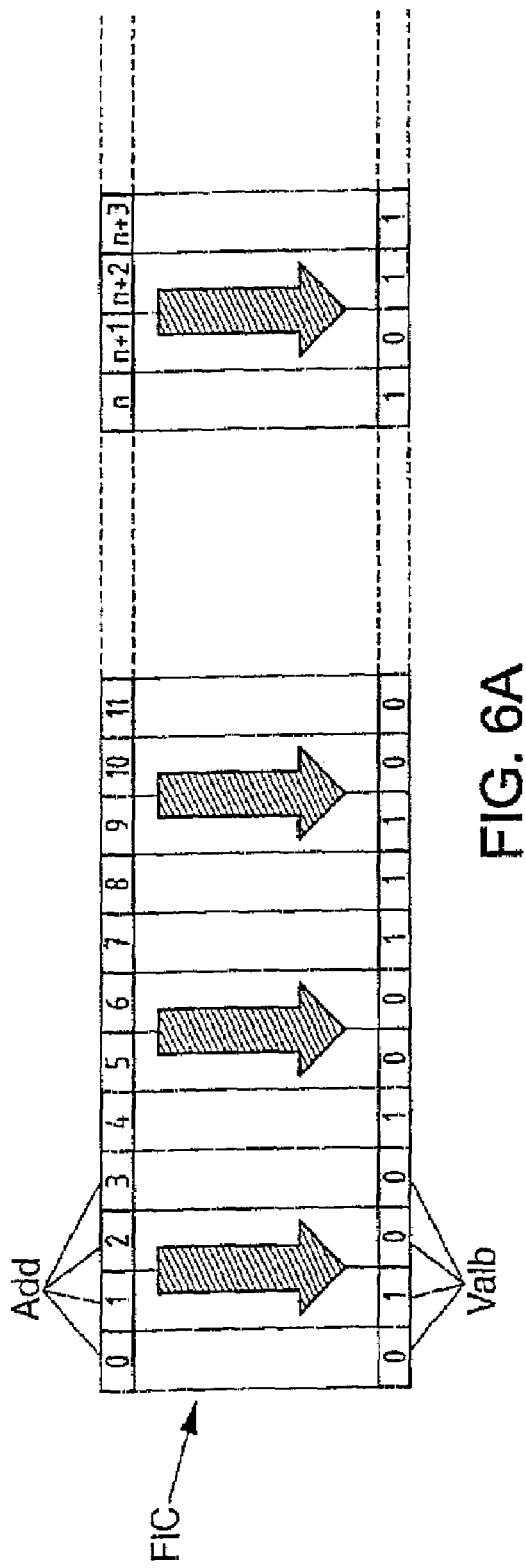
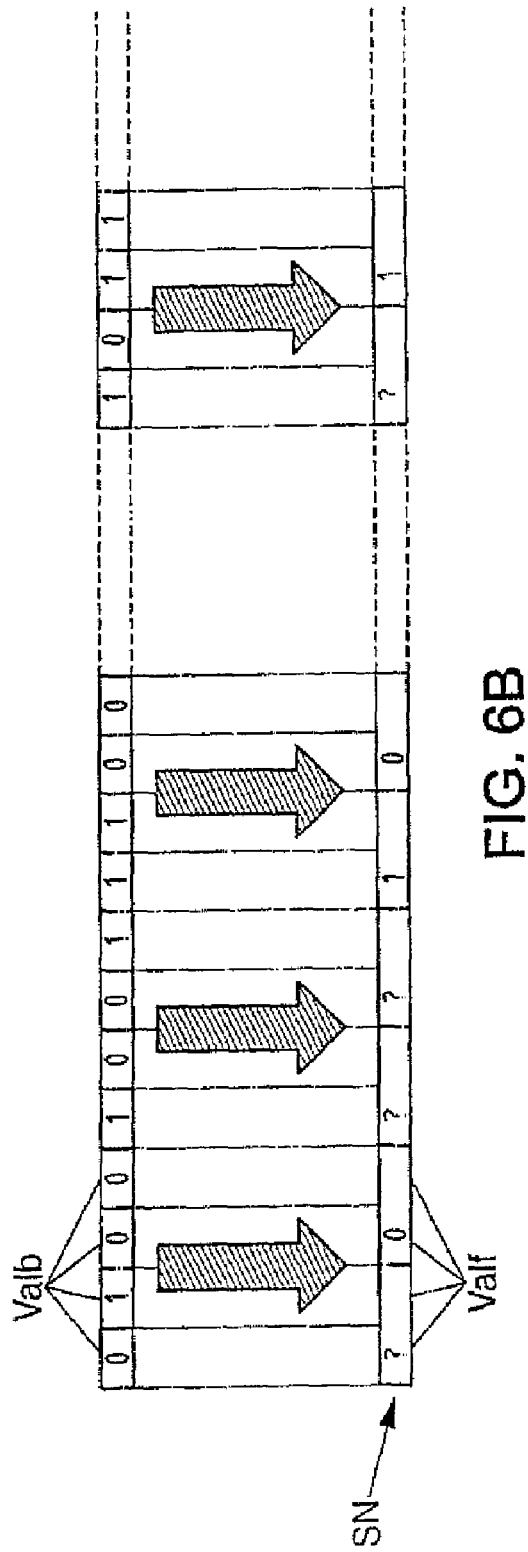
FIG. 6A
FIG. 6B

| Characters | L | a |   | t | o | r | t | u | e |
|---|---|---|---|---|---|---|---|---|---|
| Integer number of the ASCII code | 76 | 97 | 32 | 116 | 111 | 114 | 116 | 117 | 101 |
| Addresses of the data | 0 | 1 | 2 | 3 | 4 | 5 | 6 | 7 | 8 |
| Binary states | 0 | 0 | 0 | 1 | 1 | 1 | 1 | 1 | 0 |
| Fuzzy states (index ratio of 2) | 0 |   | ? |   | 1 |   | 1 |   | 0 |
| Fuzzy states with an index ratio of 3 | 0 |   |   | 1 |   |   | ? |   |   |
| Fuzzy states with an index ratio of 4 | ? |   |   |   | 1 |   |   |   | 0 |

FIG. 7A

| L | e |   | l | i | è | v | r | e |
|---|---|---|---|---|---|---|---|---|
| 76 | 101 | 32 | 108 | 105 | 232 | 118 | 114 | 101 |
| 0 | 1 | 2 | 3 | 4 | 5 | 6 | 7 | 8 |
| 0 | 0 | 0 | 0 | 0 | 1 | ? | 1 | 0 |
| 0 |   | 0 |   | ? |   | 1 |   | 0 |

| L | a |   | t | o | r | t | u | e |
|---|---|---|---|---|---|---|---|---|
| 76 | 97 | 32 | 116 | 111 | 114 | 116 | 117 | 101 |
| 0 | 1 | 2 | 3 | 4 | 5 | 6 | ? | 8 |
| 0 | 0 | 0 | 1 | 1 | 1 | 1 | 1 | 0 |
| 0 | ? |   | 1 |   | 1 |   |   | 0 |

FIG. 19A
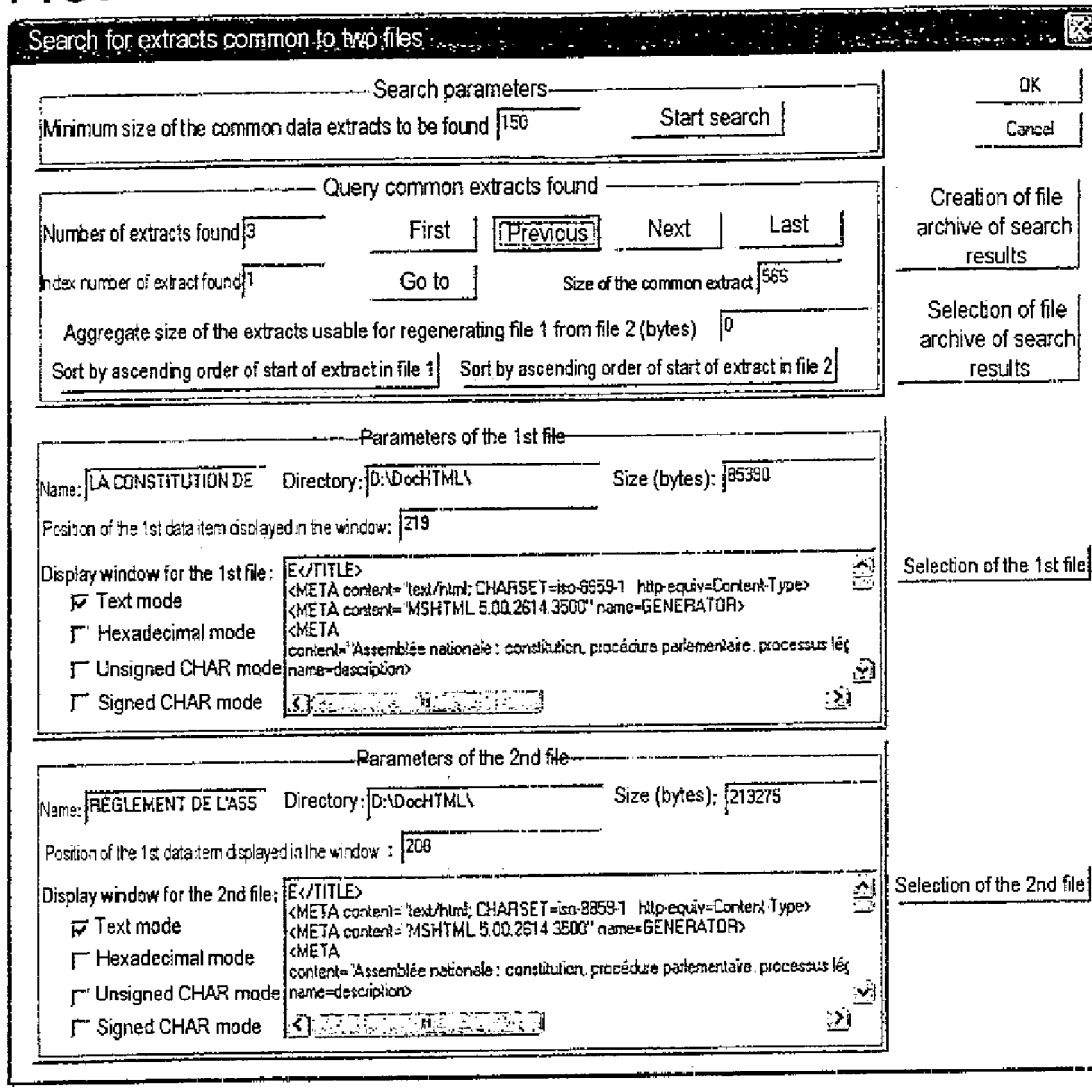
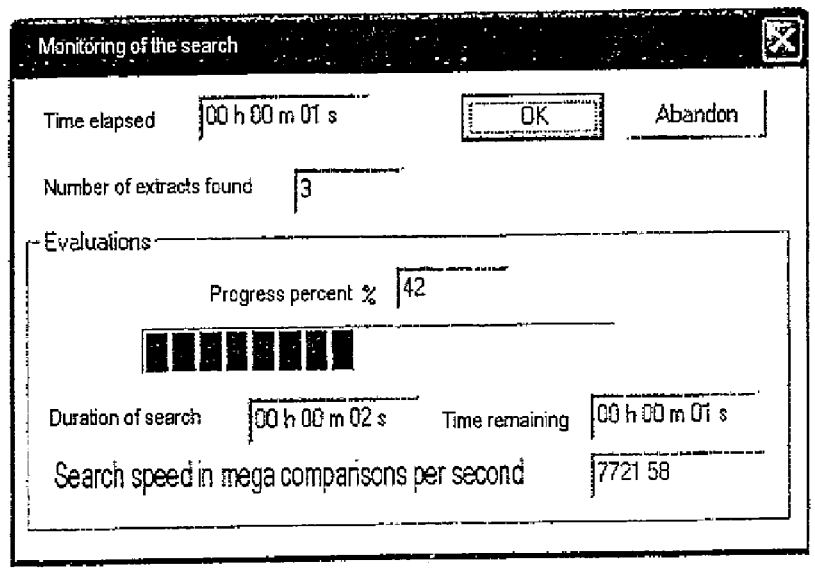
FIG. 19B

FIG. 19D

METHOD FOR SEARCHING CONTENT PARTICULARLY FOR EXTRACTS COMMON TO TWO COMPUTER FILES

CROSS REFERENCE TO RELATED APPLICATION

This is the U.S. National Phase of International Application No. PCT/FR05/00673, filed Mar. 18, 2005, the entire disclosure of which is incorporated by reference.

FIELD OF THE DISCLOSURE

The present invention relates to computer content searching, especially for extracts common to two files.

More especially, this involves searching for at least one extract common to a first file and to a second file, in the form of binary data.

BACKGROUND OF THE DISCLOSURE

The techniques known at present propose a search for identicalness, generally data item by data item. The slowness of the search, for applications with large size files, becomes crippling.

The present invention aims to improve the situation.

SUMMARY OF THE DISCLOSURE

Accordingly, it proposes a method of searching content which comprises a prior preparation of the first file at least, comprising the following steps:

a) segmenting the first file into a succession of data packets, of chosen sizer and identifying addresses of packets in said file, b) associating with the address of each packet a digital signature defining a fuzzy logic state from among at least three states: "true", "false" and "undetermined", said signature resulting from a combinatorial calculation on data emanating from said file, the method continuing thereafter with a search for common extract, properly speaking, comprising the following steps:

c) comparing the fuzzy logic states associated with each packet address of the first file, with fuzzy logic states determined on the basis of data emanating from the second file, d) eliminating from said search for common extract, pairs of respective addresses of the first and second files whose respective logic states are "true" and "false" or "false" and "true", and preserving the other pairs of addresses identifying data packets liable to comprise said common extract.

In step b), a data packet is assigned the state:

"true" if all the data of the packet satisfy a first condition,
"false" if all the data of the packet satisfy a second condition, contrary to the first condition,
and "undetermined" if certain data of the packet satisfy the first condition, while other data of the packet satisfy the second condition.

In a preferred embodiment, a processing prior to step b) is applied to the data of a file, said processing comprising the following steps:

a1) the data of the file are considered as a string of samples obtained at a predetermined sampling frequency, and of values coded according to a binary representation code, and a2) a digital filter is applied to said samples, said filter being adapted to minimize a probability of obtaining the "undetermined" state for the digital signatures associated with the packets of samples.

Advantageously, the application of said digital filter amounts to:

applying a spectral transform to the sampled data,
applying a low-pass filter to said spectral trans form,
and applying an inverse spectral transform after said low-pass filter.

The low-pass filter operates on a frequency band comprising substantially the interval:

$$[-Fe/2(k-1), +Fe/2(k-1)],$$

where Fe is said sampling frequency, and k is the number of samples that a packet comprises.

Advantageously, said digital filter comprises a predetermined number of coefficients of like value, and the frequency response of the associated low-pass filter is expressed, as a function of frequency f, by an expression of the type:

$$\sin(PI \cdot f \cdot T)/(PI \cdot f \cdot T),$$

where sin( ) is the sine function, and with:

PI=3.1416, and

T=(K−1)/Fe where K is said predetermined number of coefficients and Fe said sampling frequency.

Preferably, said digital filter is a mean value filter of a predetermined number of coefficients, and in that the difference between two successive filtered samples is proportional to the difference between two unfiltered samples, respectively of a first rank and of a second rank, which are spaced apart by said predetermined number of coefficients, and in that the calculation of said faltered samples is performed by utilizing this relation to reduce the number of calculation operations to be performed.

Said predetermined number of coefficients of the filter is greater than or equal to 2k−1, where k is the number of samples that a packet comprises, which value may be designated hereinafter by the term index ratio.

Preferably:

the "true" state is assigned to the address of a packet if, for this packet, all the filtered samples have a value greater than a chosen reference value, the "false" state is assigned to the address of a packet if, for this packet, all the filtered samples have a value less than a chosen reference value, (Vref), and the "undetermined" state is assigned to the address of a packet if, for this packet, the filtered samples have, for certain of them, a value less than said reference value, and, for other filtered samples, a value greater than said reference value.

Advantageously, for any filtered sample $r_n$ of given order n, said reference value is calculated by averaging the values of the unfiltered samples $f_k$ over a chosen number of unfiltered consecutive samples about an unfiltered sample $f_n$ of the same given order n.

The values of the filtered samples are made relative, for comparison, to a zero threshold value, and the filtered samples $r'_n$ are expressed by a sum of the type:

$$r'_n = K_{ref} \sum_{k=-(K/2)}^{(K/2)-1} f_{n+k} - K \sum_{k=-(K_{ref}/2)}^{(K_{ref}/2)-1} f_{n+k}, \text{ where:}$$

$f_{n+k}$ are unfiltered samples obtained in step a1),

K is the number of coefficients of the digital filter, preferably chosen to be even, and $K_{ref}$ is said number of unfiltered samples around an unfiltered sample $f_n$, preferably chosen to be even and greater than said number of coefficients K.

In an advantageous embodiment, said sum is applied to the unfiltered samples $f_n$ a plurality of times, according to a processing performed in parallel, while respectively varying the number of coefficients K. This measure then makes it possible to determine a plurality of digital signatures, substantially statistically independent.

In a particular embodiment, the fuzzy states associated with the first file at least are each coded on at least two bits.

In this embodiment, the fuzzy states determined for a least number of coefficients K are coded on least significant bits and the fuzzy states determined for a larger number of coefficients K are coded on subsequent bits, up to a chosen total number of bits. It will be understood that this chosen number may be advantageously adapted to the binary data size used by the microprocessors of computer entities for comparison logic operations.

Preferably, each filtered sample $r_n$ is expressed as a sum of the type:

$$r_n = \sum_{i=-J_1}^{I_2} filter_i \times f_{(n+i)}, \text{ where:}$$

$f_{(n+i)}$ are unfiltered samples, $filter_i$ are coefficients of a digital filter, integrating, as the case may be, a threshold value referred to zero, and a number k of unfiltered samples that a packet comprises is chosen, at minimum equal to 2 and less than or equal to an expression of the type:

$(TEF-I_1-I_2+1)/2$, where TEF is a desired minimum size of the common extracts searched for.

This measure advantageously makes it possible to ensure an overlap of a packet of k data which is used for the calculation of a single digital signature data item.

In this embodiment, for a given value TEF of the desired minimum size of common extracts searched for, a span of usable values for said number k of unfiltered samples that a packet comprises is determined, and, for each usable value of the number k, an optimal size TES is determined of a succession of data of digital signatures, for which succession the detection of a common extract of size TEF is guaranteed.

Said optimal size TES is then less than or equal to an expression of the type:

$E[(TEF-I_1-I_2+1)/k]-1$, where E(X) designates the integer part of X.

For an application in which the two files to be compared comprise data representative of alphanumeric characters, in particular of the text and/or a computer or genetic code, the method advantageously comprises:
  a first group of steps comprising the formation of the digital signatures and their comparison, for a coarse search, and
  a second group of steps, in particular for a fine search, comprising an identicalness comparison in the spans of addresses satisfying the coarse comparison, the data of a file are considered as a string of samples, with a chosen number k of samples per packet, the value of this chosen number k being optimized initially by searching for a minimum of comparison operations to be performed.

For the optimization of the chosen number k of samples per packet, account is advantageously taken of a total number:
  of operations of comparison of digital signatures to be performed, and
  of operations of identicalness comparison of data to be performed thereafter, this total number of operations being a minimum for a finite set of numbers k.

The method advantageously provides for a step in the course of which a cue relating to a minimum desired size of common extracts searched for is obtained, used to optimize said chosen number k of samples per packet. This optimal number k of samples per packet varies substantially as said minimum size, so that the larger the desired minimum size of common extracts searched for, the more the total number of companion operations decreases, and therefore the shorter the duration of the search for common extract.

For other applications such as searching of content of audio, video or other files, the search for common extracts preferably consists of a single group of steps comprising the formation of the digital signatures and their comparison. The number of data items per packet is then optimized by initially fixing a confidence index characterizing an acceptable threshold of probability of false detection of common extracts.

In a preferred general embodiment, for the first file:
  we apply the sampling at a chosen sampling frequency,
  the digital filtering corresponding to a low-pass filtering in the frequency space, and
  the combination of the filtered samples to obtain digital signatures in the "true", "false" or "undetermined" state, associated with the respective addresses of the first file, while, for the second file:
  we apply the sampling at a chosen sampling frequency,
  the digital filtering corresponding to a low-pass filtering in the frequency space, and
  we determine the logic state associated with each packet of filtered samples on the basis of the logic state associated with a single filtered sample chosen from each packet (preferably as being the first sample of each packet), in such a way as to obtain digital signatures comprising only "true" or "false" logic states and thus to improve the selectivity of the comparison of the digital signatures.

In this embodiment,
  if the logic state associated with an address of the first file is "true" or "undetermined", while the logic state associated with an address of the second file is "true", the pair of said addresses is retained from the search of common extract,
  if the logic state associated with an address of the first file is "false" or "undetermined", while the logic state associated with an address of the second file is "false", the pair of said addresses is retained for the search for common extract, while the other pairs of addresses are excluded from the search.

Of course, the method within the meaning of the present invention is implemented by computer means such as a computer program product, described later. In this regard, the invention is also aimed at such a computer program product, as well as a device, such as a computer entity, comprising such a program in one of its memories. The invention is also aimed at a system of computer entities of this type, that communicate, as will be seen later.

This computer program is capable in particular of generating a digital signature of a file of binary data, this digital signature thereafter being compared with another signature for the search for common extract. It will be understood that the digital signature of any data file, which signature is formulated by the method within the meaning of the invention, is an essential means for undertaking the comparison step. In this regard, the present invention is also aimed at the data structure of this digital signature.

BRIEF DESCRIPTION OF THE DRAWINGS

Other characteristics and advantages of the invention will become apparent on examining the detailed description hereinbelow, and the appended drawings in which:

FIG. 4A represents a two dimensional array for the comparison of the digital signatures of two text files "Des moutons" and "Un mouton", with an index ratio of 2, FIG. 4B represents a two dimensional array for the fine comparison of identicalness, which follows in principle the step of coarse searching of FIG. 4A, of the two text files "Des moutons" and "Un mouton", FIGS. 5A and 5B respectively represent the truth tables of the "OR" and "AND" functions in binary logic, FIG. 5C represents an array for coding the fuzzy states on two bits B0 and B1, FIGS. 5D and 5E respectively represent the truth tables of the "OR" and "AND" functions in fuzzy logic (by application of the law of coding of fuzzy states of FIG. 5C), FIGS. 6A and 6B respectively represent the values of the binary logic states associated with the data of a file as a function of the addresses of these data in the file and the fuzzy logic state values associated globally with these data as a function of the same addresses (the "OR" fuzzy logic function having been applied here in each block of data between the logic states associated with each data item of a block), FIGS. 7A, 7B and 7C represent arrays for determining binary and fuzzy states on the basis of an example of text files. For these examples, the binary states are determined on the basis of the following law:

Figure 8A:
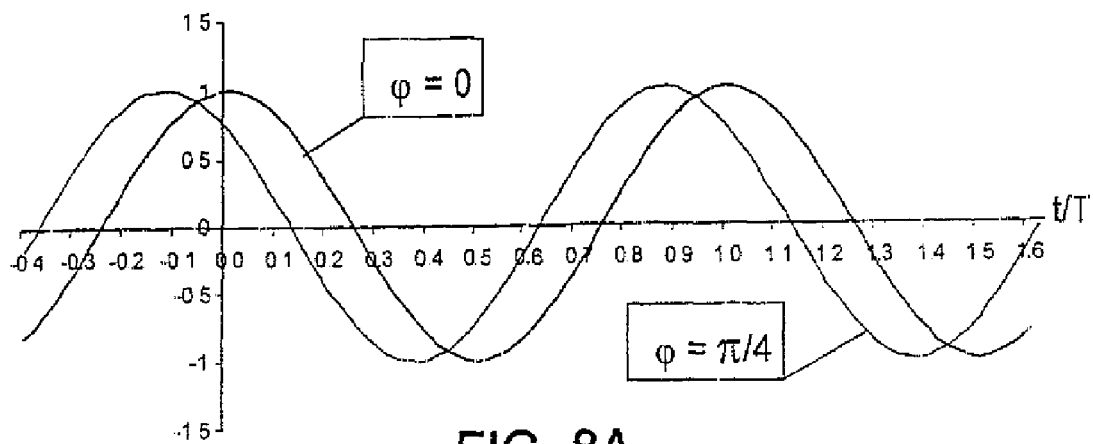
Figure 8B:
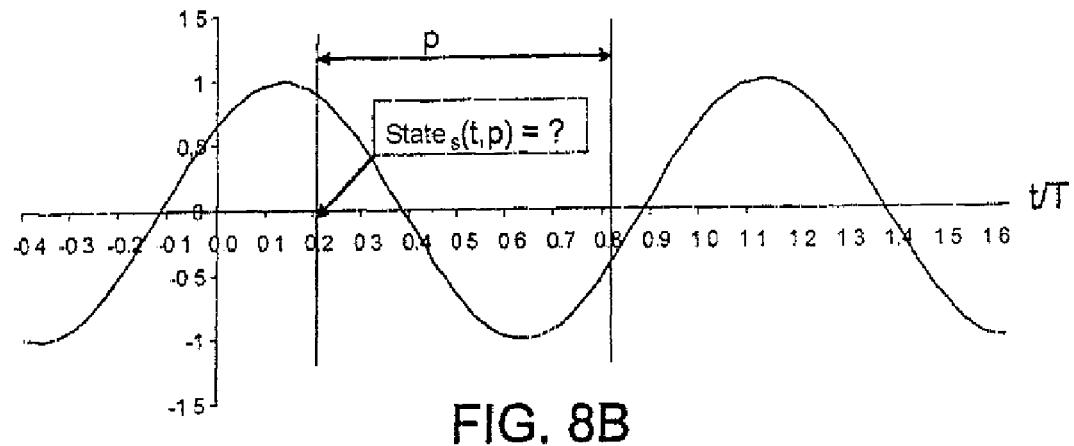
Figure 8C:
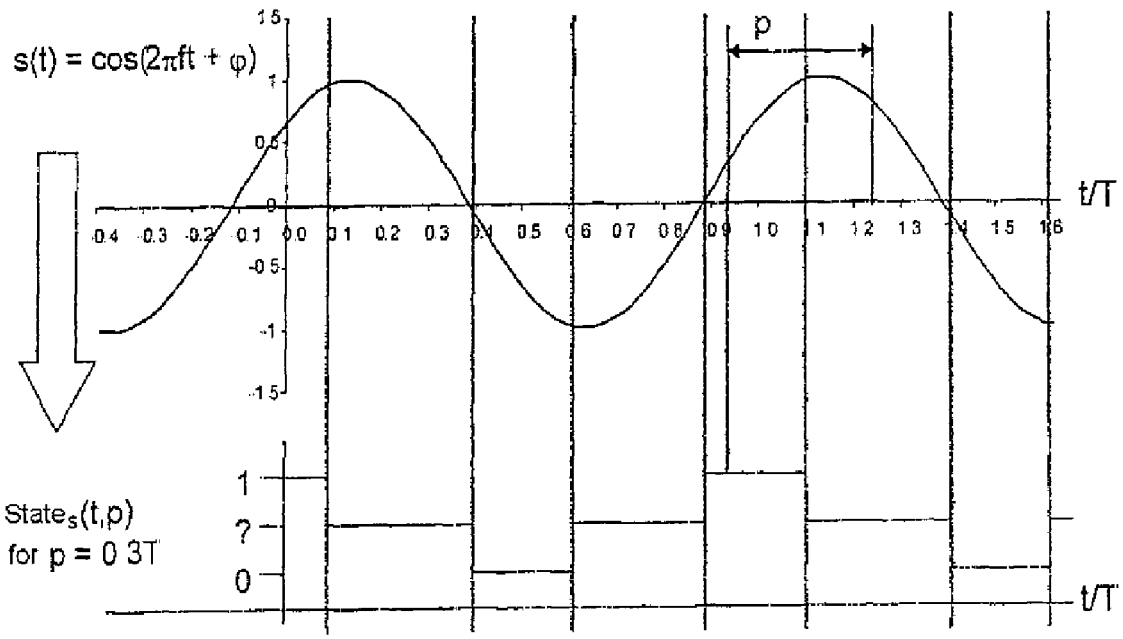
Figure 9A:
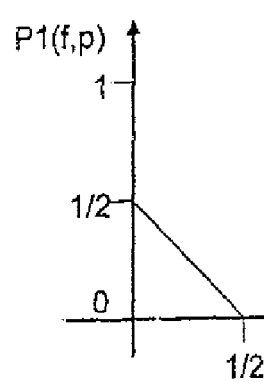
Figure 9B:
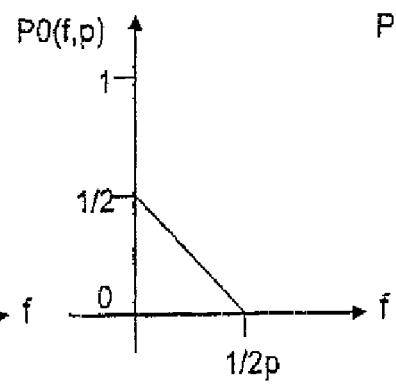
Figure 9C:
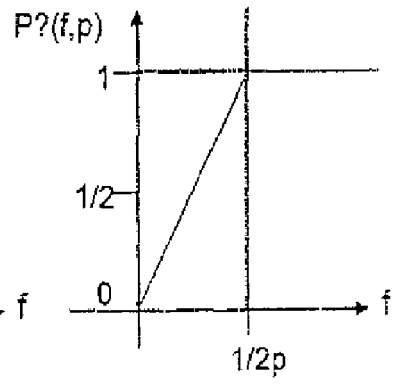
Figure 10:
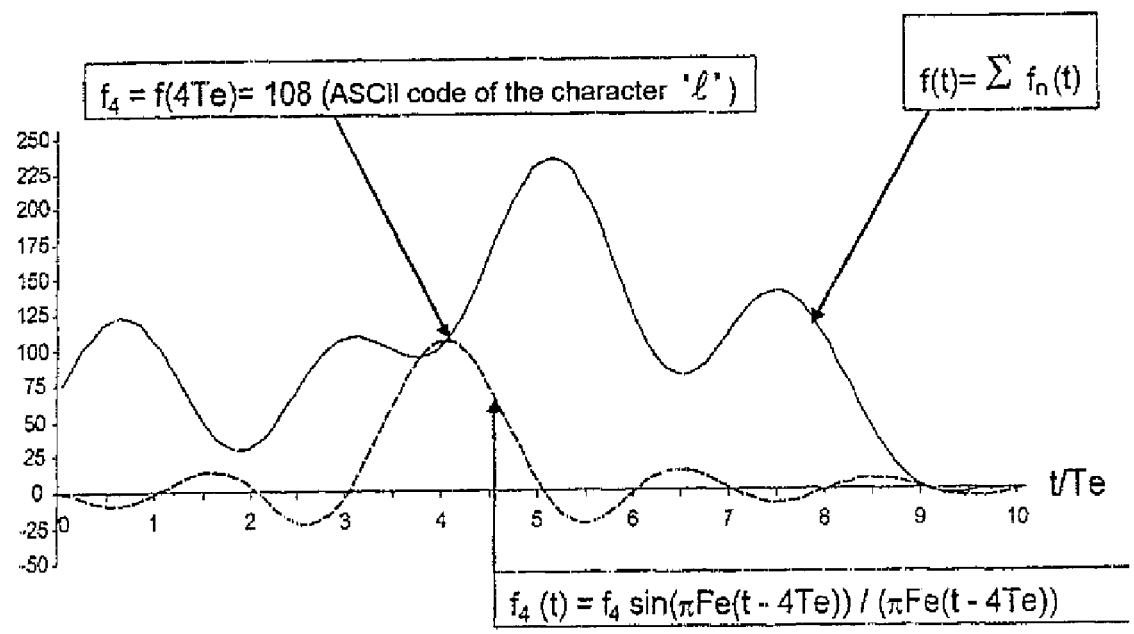
Figure 11:
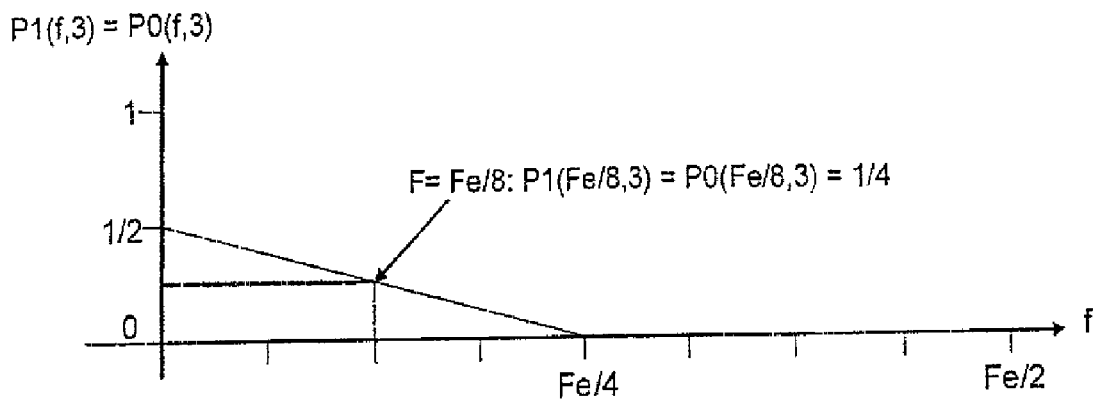
Figure 12A:
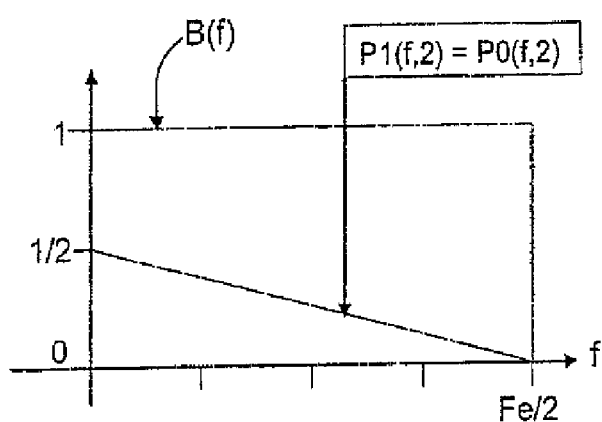
Figure 12B:
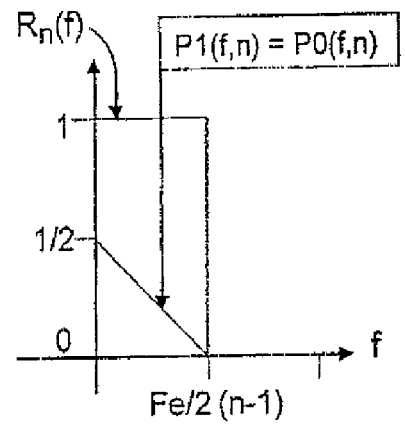
Figure 13:
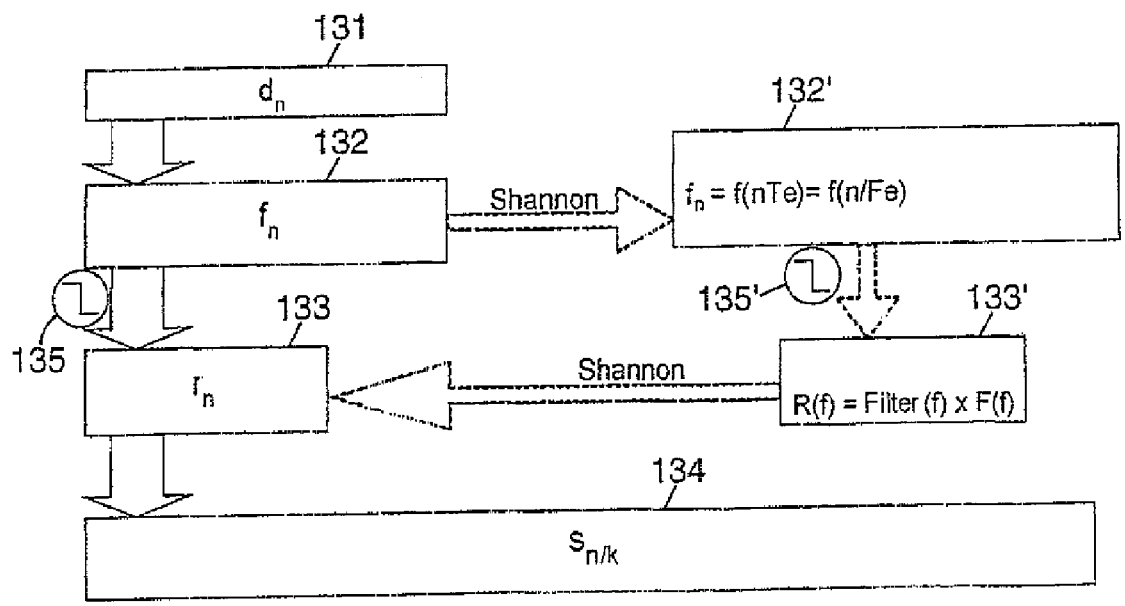
Figure 14:
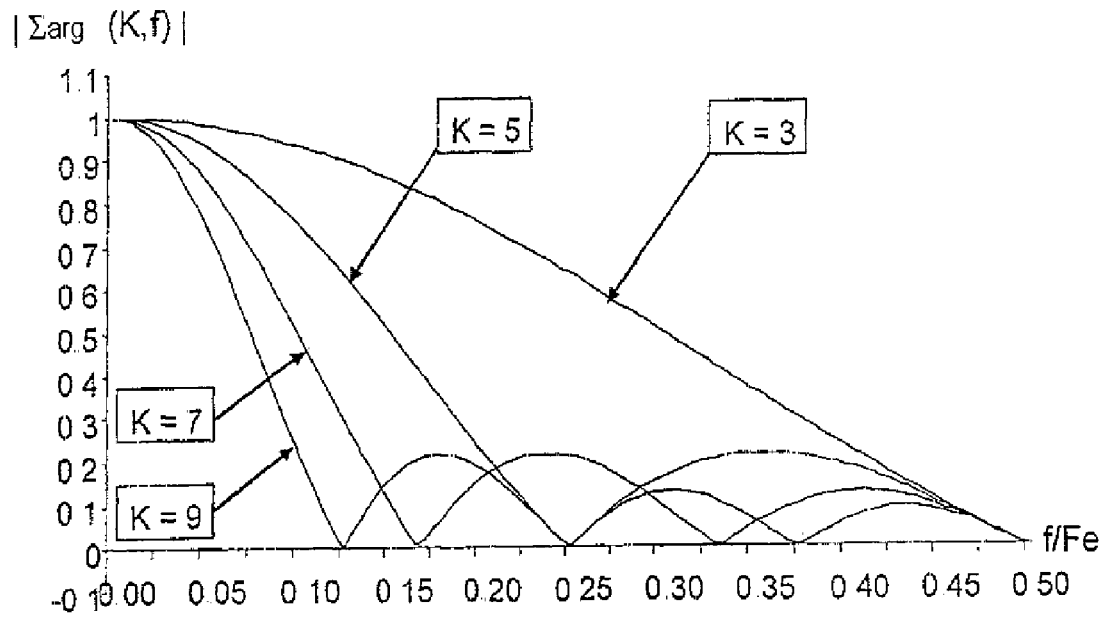
Figure 15:
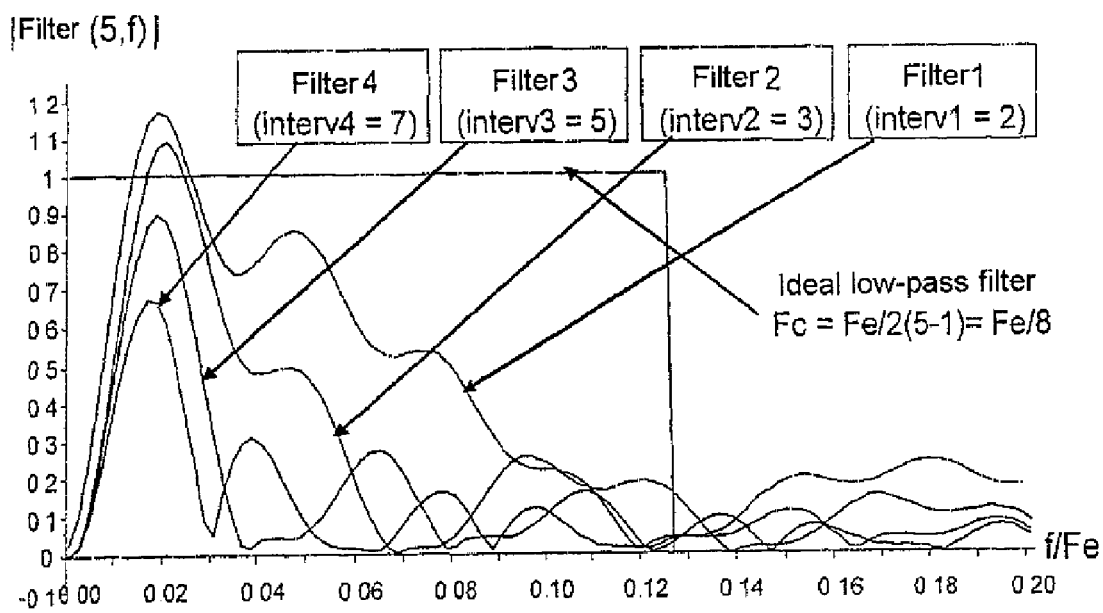
Figure 16A:
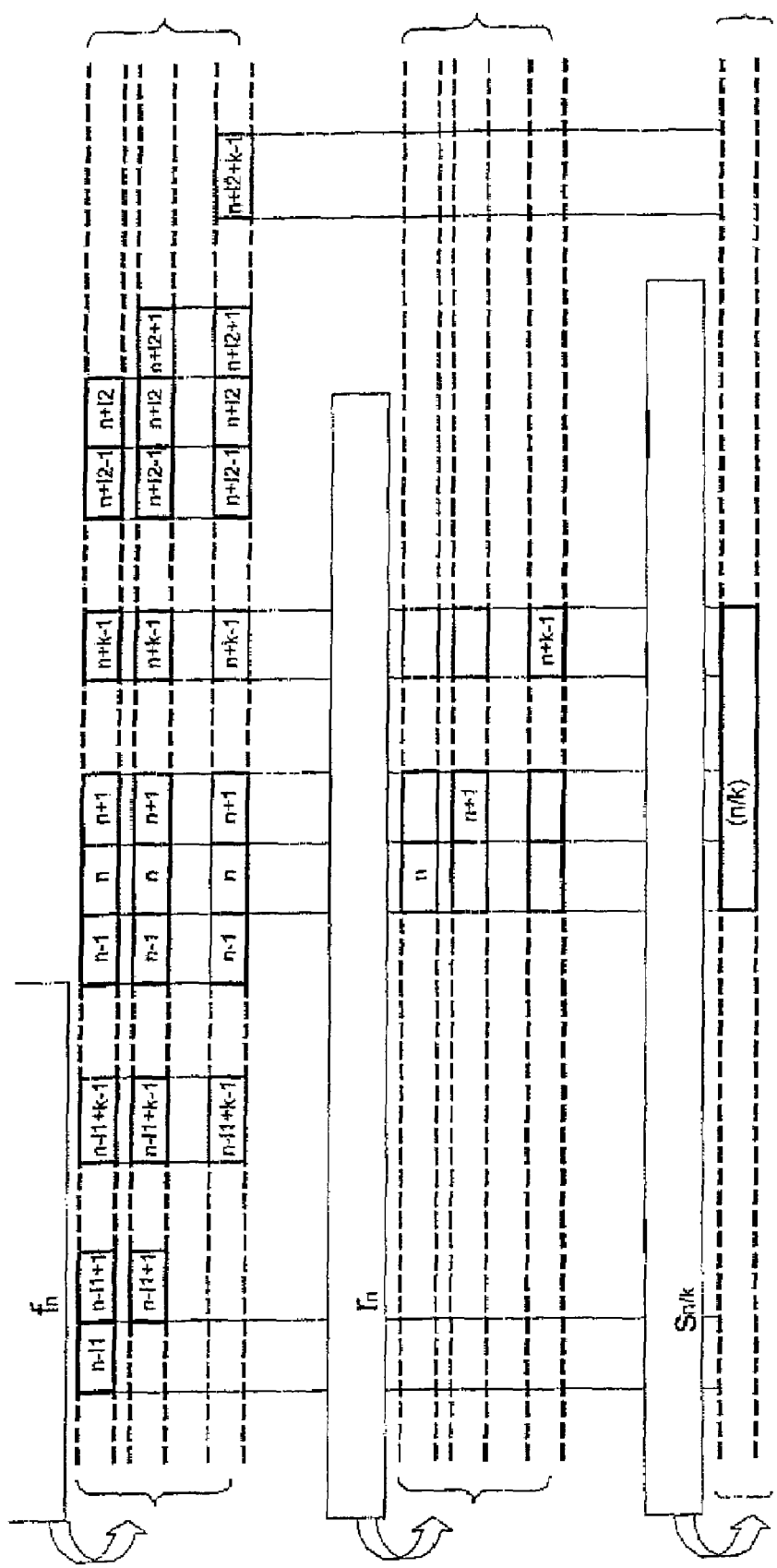
Figure 16B:
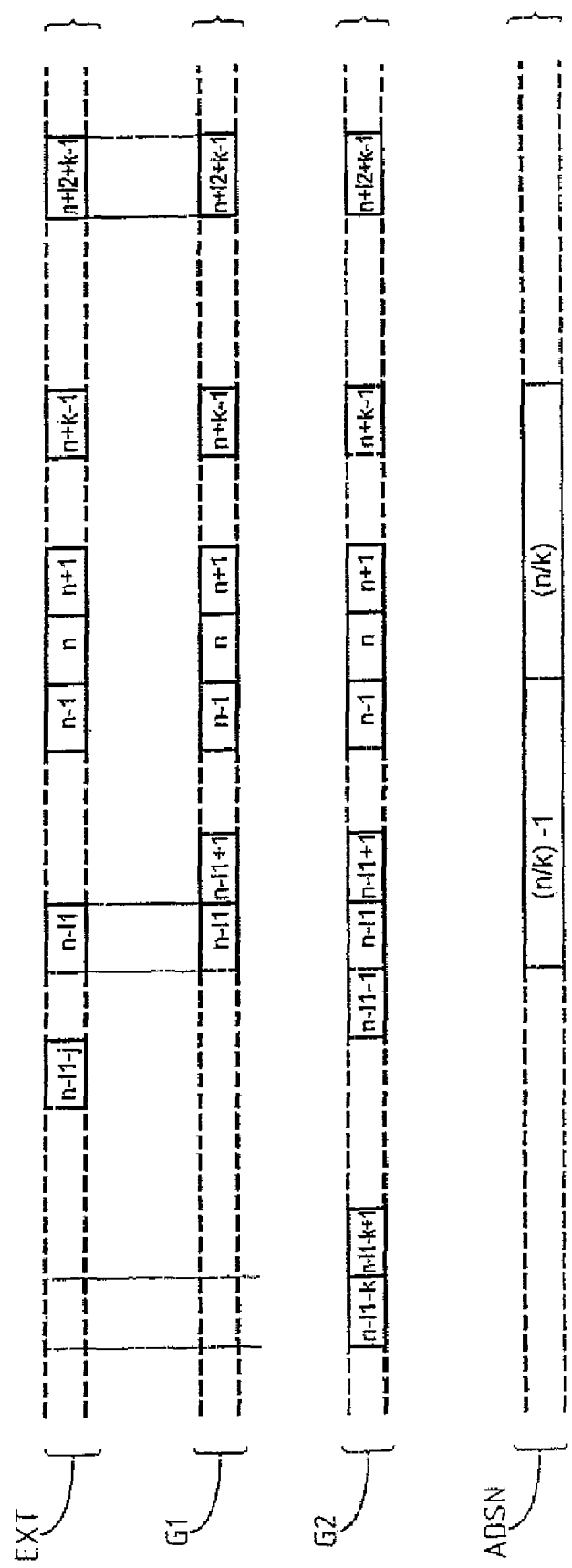
Figure 17:
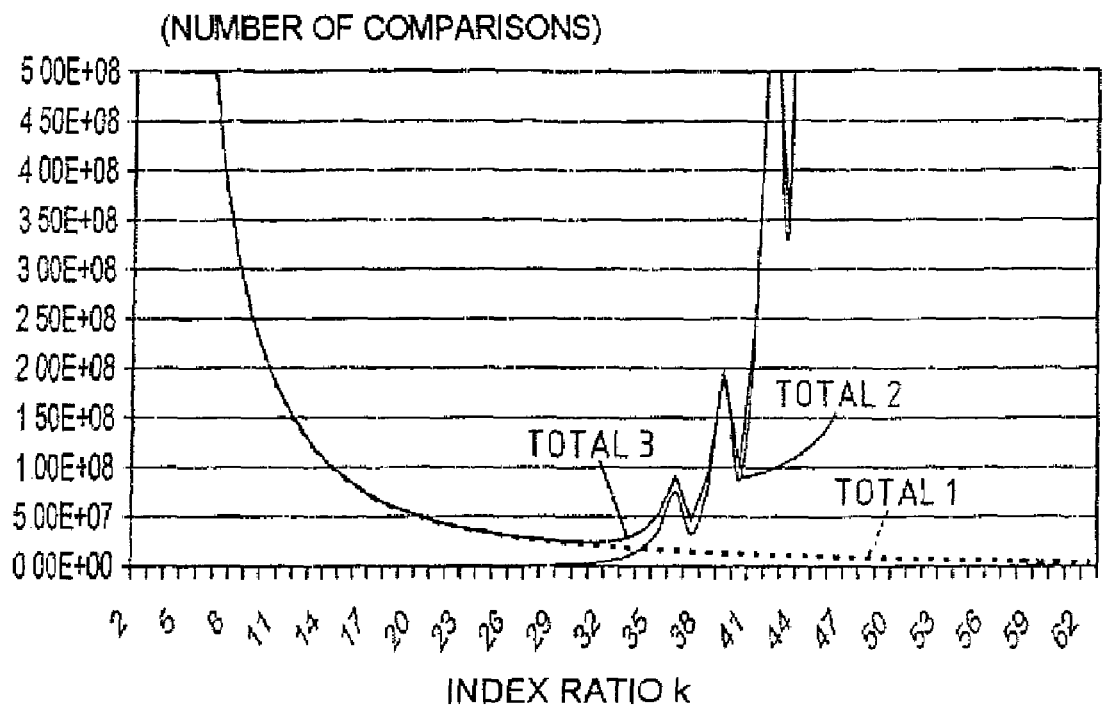
Figure 18:
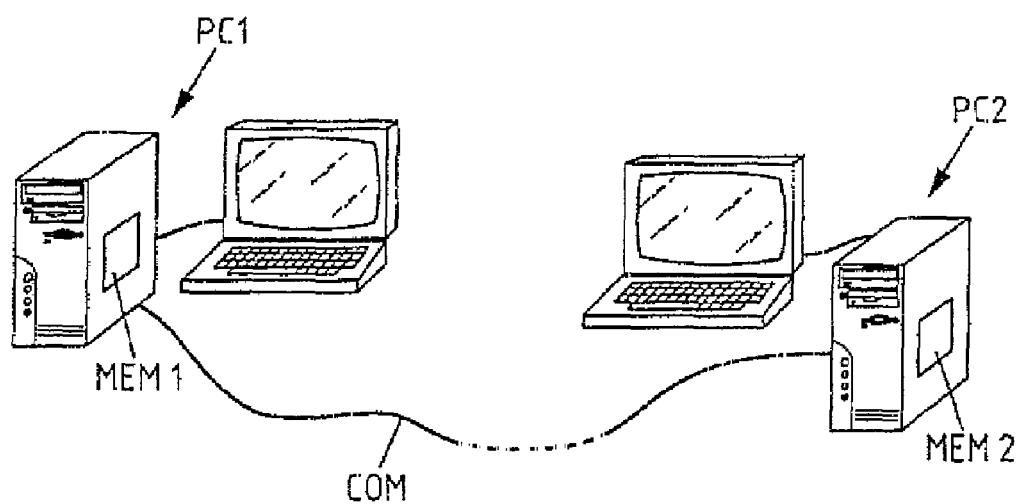
Figure 19C:
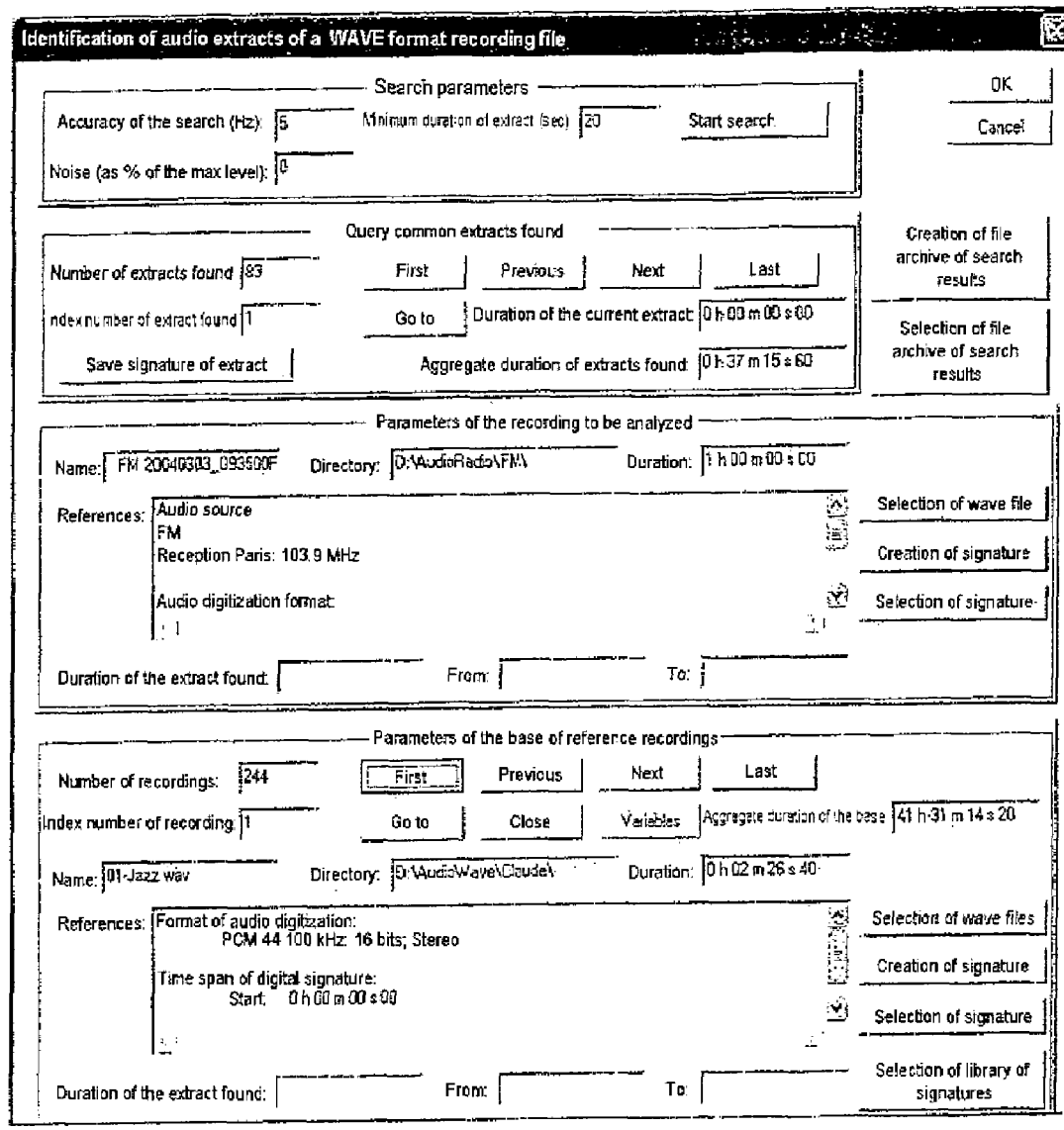

0 if the integer value of the ASCII code of the character is strictly less than 111, 1 the integer value of the ASCII code of the character is greater than or equal to 111;

FIG. 7A is an array representing the various fuzzy states associated with a text file "La tortue" for various values of the index ratio, FIG. 7B represents arrays giving respectively the digital signatures associated with the respective files "Le lièvre" and "La tortue", for an index ratio of 2, FIG. 7C represents an array comparing the digital signatures of FIG. 7B for the search for common extracts, FIG. 8A represents a cosinusoid function with various phases as a function of a variable t/T where T is the period of the function, FIG. 8B represents the determination of the fuzzy logic state associated pointwise with a value of the variable t/T by application for the whole set of values belonging to the segment [t/T,t/T+p] of a logic combination between the binary states obtained on the basis of the sign of the cosinusoid function, FIG. 8C represents the variations of the fuzzy logic states which are determined for each value of the variable t/T by application for the whole set of values belonging to the segment [t/T,t/T+p] of a logic combination between the binary states obtained on the basis of the sign of the cosinusoid function, FIGS. 9A to 9C respectively represent the probabilities of drawing the "1" fuzzy state, the "0" fuzzy state and the "?" fuzzy state, as a function of the frequency f associated with a cosinusoid and as a function of the size p of the segments, FIG. 10 represents the variations of the function f(t/Te) which is obtained by interpolation of the values taken by the samples $f_n$ Of the text file "Le lièvre" (the dashed curve represents the contribution of the sample $f_4$ to the construction of the curve f(t/Te)), FIG. 11 represents the probabilities of drawing the "1" fuzzy state (or else the "0" fuzzy state), as a function of the frequency f, with an index ratio of 3, FIGS. 12A and 12B represent the probabilities of drawing the "1" fuzzy state (or else the "0" fuzzy state), as a function of frequency f, with respective index ratios of 2 and of n (n>2), FIG. 13 diagrammatically represents the various sampling and filtering steps implemented to obtain a digital signature $s_{n/k}$, FIG. 14 represents the shapes, in absolute value, of the filtering functions Filter(K,f)=Σavg(K,f) (integrating the incorporation of a mean value of K samples about a central sample), for a few values of K, as a function of f/Fe, FIG. 15 represents the frequency responses of the default digital filters adjusted for an index ratio k=5, with several values of the interv parameter described in the description hereinbelow, FIG. 16A represents the addresses of samples $f_n$ of data to which a sampling has been applied, the addresses of samples $r_n$ to which a digital filtering has been applied and finally the addresses of blocks of the digital signature which is obtained by combination ("OR" in fuzzy logic of the filtered samples $r_n$), FIG. 16B represents the conditions of overlapping of the data blocks associated with the calculation of the data of digital signatures by the data of an extract EXT to be searched for in a data file, FIG. 17 represents the number of comparisons to be performed as a function of the index ratio k, for a coarse search (Total1), for a fine search thereafter (Total2), and for the two searches together (Total3), and, in the example of a search for common extracts of minimum size of 1000 characters between two files of size 100 Kbytes, FIG. 18 represents a system of computer entities communicating for the implementation of an advantageous application of the invention, upon the updating of computer files remotely, FIG. 19A represents a screen copy of a dialogue box within the framework of a man machine interface of a computer program within the meaning of the invention, for a search for, extracts common to text files, FIG. 19B represents a screen copy indicating the progress of the search, FIG. 19C represents a screen copy for a search for, extracts common to two audio files, FIG. 19D represents a screen copy for the creation of a digital signature file formulated on the basis of a real-time processing of audio signals.

DETAILED DESCRIPTION OF THE DISCLOSURE

The method within the meaning of the invention consists in inter-comparing computer files so as to search therein for all the possible common extracts. The examination pertains directly to the binary representation of the data which constitute the files and, advantageously, does not therefore require prior knowledge of the format of the files. Moreover, the files to be compared may be of any nature, such as for example, text files, multimedia files comprising sounds or images, data files, or the like.

In the example of a document stored in a file in text format, an extract could for example be a word, a phrase or a page of text.

For the method within the meaning of the invention, the expression "extract common to two files" is understood as follows. This entails a sequence of consecutive data whose content is fixed and which may be obtained either by copying the binary data of the first file commencing from a determined start address, or by copying the binary data of the second file commencing from another determined start address. Stated otherwise, if an extract is lifted from each file commencing from the labeled start positions, the condition of common extract will be achieved if there is perfect identity of the contents carried by the first binary data item of each extract, then of those carried by the next binary data item, and so on and so forth. Typically, in the case of text format files, each byte carries the ASCII code of a printable character (Latin alphabet, digit, punctuation mark, and the like). The perfect identity of the contents of two bytes is therefore equivalent to perfect identity of the characters coded by these bytes. Any common extract found is labeled by a pair of start addresses (one per file) and by a size expressed as a number of bytes.

Described hereinbelow is an exemplary extract taken from a short text file. The text chosen is "Le lièvre et La tortue". Its representation in the form of a file in text mode is represented by way of example in the array below. The size of the file is 22 bytes. The binary data (bytes) carry the ASCII codes which are associated with each character of the text and are displayed in integer mode.

| Character of the text | L | e | l | i | è | v | r | e | | e |
|---|---|---|---|---|---|---|---|---|---|---|
| Integer number of the ASCII code | 76 | 101 | 32 | 108 | 105 | 232 | 118 | 114 | 101 | 32 | 101 |
| Address of the data | 0 | 1 | 2 | 3 | 4 | 5 | 6 | 7 | 8 | 9 | 10 |
| Character of the text | t | | l | a | | t | o | r | t | u | e |
| Integer number of the ASCII code | 116 | 32 | 108 | 97 | 32 | 116 | 111 | 114 | 116 | 117 | 101 |
| Address of the data | 11 | 12 | 13 | 14 | 15 | 16 | 17 | 18 | 19 | 20 | 21 |

Each file is represented in the form of a one-dimensional array in which the binary data are arranged with the same order as that used for storage on disk. The binary data are bytes (8-bit words). The array is therefore of the same size as that of the file, in bytes. Each cell of the array is labeled by an address. According to the conventions used in programming, the address 0 points to the first cell of the array, the address 1 to the next cell, and so on and so forth.

The term "extract", especially in the formula "common extract", is understood as follows. It entails a sequence of consecutive data, said sequence being obtained by copying the binary data of a file commencing from a determined start address. This sequence is itself represented in the form of a binary data array with which is associated a start address which makes it possible to label the extract in the original file. It is indicated that the binary data are bytes (8-bit words). Each data item is represented by the integer number (lying between 0 and 255) which is obtained by addition to the base 2 of the bits of the byte:

$$B_0 + 2^1 B_1 + \ldots + 2^7 B_7$$

The array therefore clearly has the same size as that of the extract (in bytes). This size of extract may lie between 1 and that of the file.

The "lièvre" extract is found in the file. Its representation in the form of a data array is in the next array. It occupies 6 binary data items. Its start position in the file is the address 3.

| | Character of the extract | | | | | |
|---|---|---|---|---|---|---|
| | l | i | è | v | r | e |
| Interger number of the ASCII code | 108 | 105 | 232 | 118 | 114 | 101 |
| Address of the data | 0 | 1 | 2 | 3 | 4 | 5 |

An example of extracts common to two short text files is now described. The texts chosen are "Le lièvre" and "La tortue". The representations in the form of files in text mode are those of the array below. The size of each file is 9 bytes. The binary data (bytes) are displayed in integer mode.

| Character of 1st test | L | e |   | l | i | è | v | r | e |
|---|---|---|---|---|---|---|---|---|---|
| Integer number of the ASCII code | 76 | 101 | 32 | 108 | 105 | 232 | 118 | 114 | 101 |
| Adress of the data | 0 | 1 | 2 | 3 | 4 | 5 | 6 | 7 | 8 |

| Character of 2nd text | L | a |   | t | o | r | t | u | e |
|---|---|---|---|---|---|---|---|---|---|
| Integer number of the ASCII code | 76 | 97 | 32 | 116 | 111 | 114 | 116 | 117 | 101 |
| Address of the data | 0 | 1 | 2 | 3 | 4 | 5 | 6 | 7 | 8 |

There are therefore five extracts common to the files. They are presented in ascending order of start addresses on the first file:

"L": position (0, 0) and size 1
"e": position (1, 8) and size 1
" ": position (2, 2) and size 1 ("space" character)
"r": position (7, 5) and size 1
"e": position (8, 8) and size 1

It is indicated that the characters "L" and "l" are distinct since the values of their ASCII codes are different.

In order to avoid a profusion of search results, a value of the minimum size of the common extracts to be found is used as selection criterion. It is easily understood that the probability of finding extracts decreases as the size of the extracts to be searched for increases. Consequently, if two files are intercompared, the number of common extracts found will decrease as the minimum size of the extracts to be found increases.

With the same aim, one tries moreover to eliminate the search results which overlap. This processing is advised but is not indispensable. Its complete implementation in fact requires storing the whole set of search results so as to be able to eliminate therefrom those which are overlapped by other search results.

Described hereinbelow is another example of extracts, common to two short text files. The texts chosen are "Un mouton" and "Des moutons". The minimum size of the common extracts searched for is 6 bytes. The binary data (bytes) are displayed in integer mode.

The representations in the form of files in text mode are in the array below.

An extract common to the files is found: "mouton" at position (2, 3) and of size 7.

As indicated above, the " " (space) character is treated as a data item. Two common extracts of size 6 are eliminated from the search results since they are overlapped by the extract "mouton" of larger size (7). We have:

"mouto": position (2, 3) and size 6
"mouton": position (3, 4) and size 6

These basic principles being defined, a so-called "conventional" search algorithm using said principles is now described. Globally, the search strategy implemented is to examine all the possible pairs of start positions which can be taken by a common extract on the two files to be compared. The algorithm described here is defined by the term "conventional". However, this definition does not necessarily imply that it can be found in the prior art. It should simply be understood that the algorithm within the meaning of the present invention performs extra operations, in particular for formulating digital signatures, which will be described later.

For each value of pair of start positions (one start position per file), a comparison is performed between the extracts which can be lifted from each file. This comparison indicates whether the common extract condition is achieved and determines the maximum size of the common extract found for the pair of start positions that is considered. As appropriate, this size is finally compared with the value of the minimum size of the common extracts to be found.

For any pair of start positions on the files, one and the same succession of steps is used to identify the existence of a common extract. The pairs of start positions are tested with the following predefined order:

| | Character of 1st text | | | | | | | | |
|---|---|---|---|---|---|---|---|---|---|
| | U | n |   | m | o | u | t | o | n |
| Integer number of the ASCII code | 85 | 110 | 32 | 109 | 111 | 117 | 116 | 111 | 110 |
| Address of the data | 0 | 1 | 2 | 3 | 4 | 5 | 6 | 7 | 8 |

| | Character of 2nd text | | | | | | | | | |
|---|---|---|---|---|---|---|---|---|---|---|
| | D | e | s |   | m | o | u | t | o | n | s |
| Integer number of the ASCII code | 68 | 101 | 115 | 32 | 109 | 111 | 117 | 116 | 111 | 110 | 115 |
| Address of the data | 0 | 1 | 2 | 3 | 4 | 5 | 6 | 7 | 8 | 9 | 10 | start of the analysis with the pair of start positions (0, 0),
ascending order of the start positions on the first file, and ascending order of the start positions on the second file for all the pairs having the same start position on the first file,
end of analysis for the pair of positions (last data item of the first file, last data item of the second file),
the pair (n, m) finally labels the start position n on the first file and the start position m on the second file.

In the case where the search has been stopped so as to display a common extract found at the position (n, m), the search for other common extracts resumes commencing from the next pair of start positions:

(n, m+1) in the general case, or (n+1, 0) in the particular case where the position m+1 overshoots the last data item of the $2^{nd}$ file and where the position n+1 does not overshoot the last data item of the first file.

Figure 1:
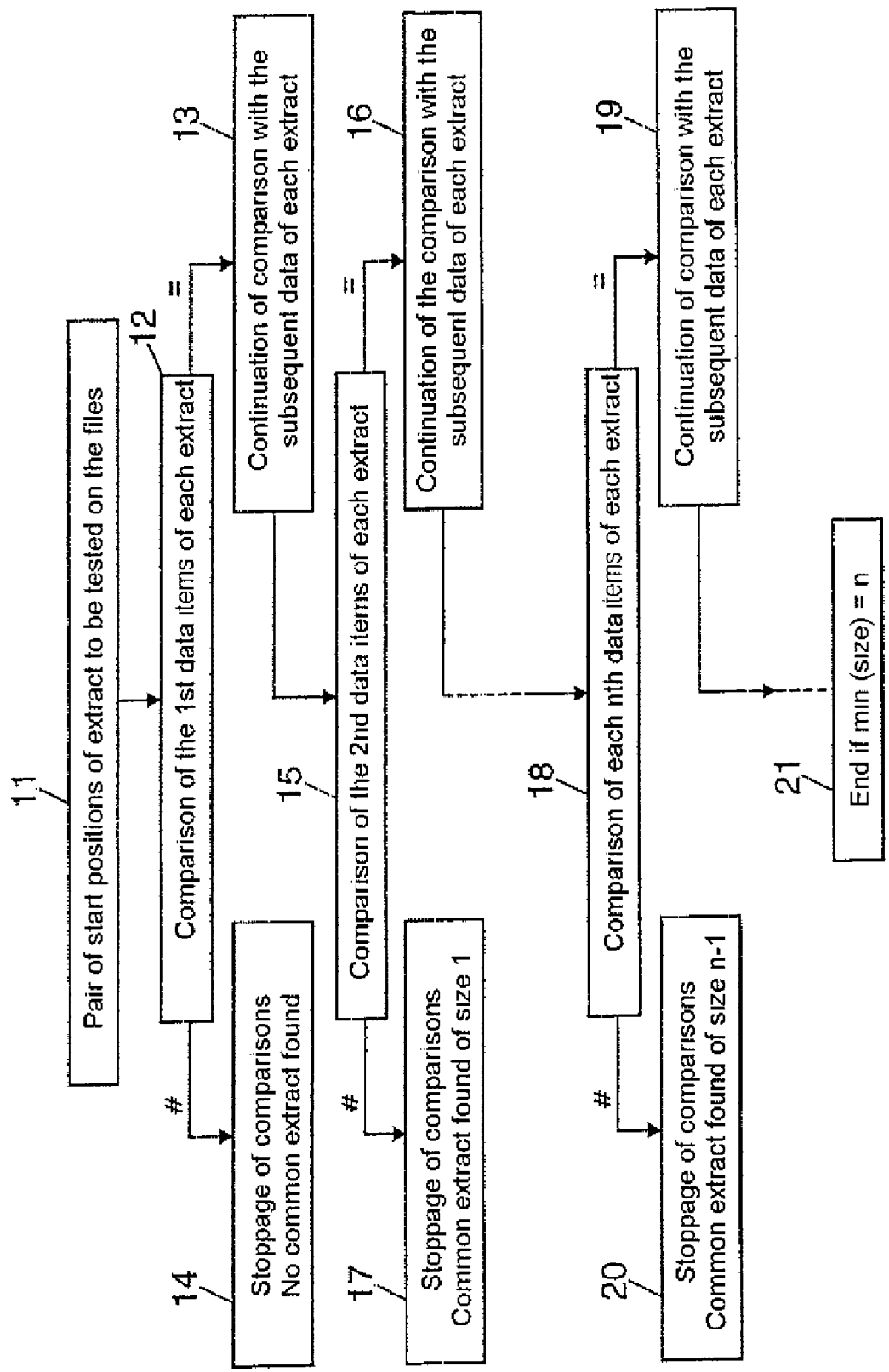
FIG. 1 substantially summarizes the main steps of fine searching.

Referring to FIG. 1, a pair of start position of extract to be tested on the two files (step 11) is thus fixed. The first data of each extract is then compared (step 12). In case of identity, the comparison is continued with the next data of each extract (step 13). Otherwise (in the case where no common extract is found), the comparisons are stopped (step 14). The same steps are repeated for the second data of each extract (steps 15, 16 and 17), doing so up to the nth data (steps 18, 19 and 20). For example, the comparison may terminate if the size of extract is reached for the value n (step 21).

Figure 2A:
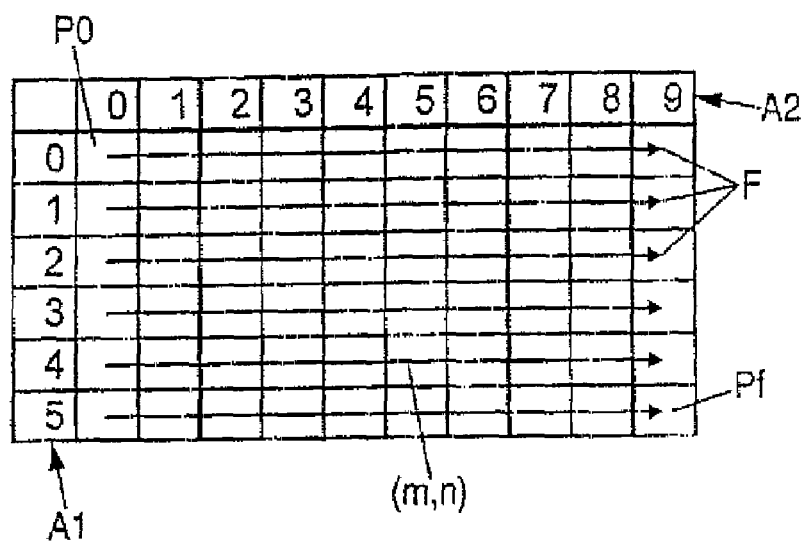
FIG. 2A diagrammatically represents the layout of a two dimensional array for the comparison of two data files, as a function of the addresses of the data of these two files, FIG. 2B diagrammatically represents a two dimensional array for the comparison of identicalness of two text files "Des moutons" and "Un mouton"
Figure 2B:
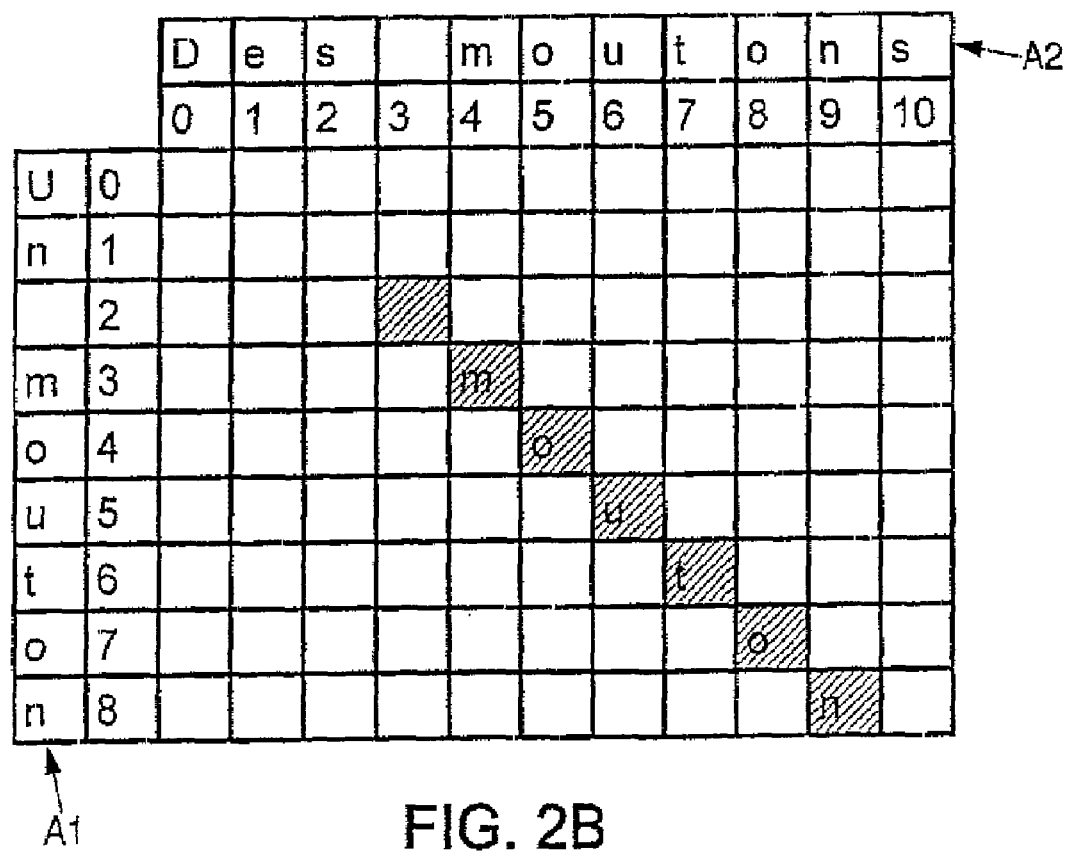

Described hereinbelow is a two dimensional representation using an array represented in FIG. 2A.

The vertical axis A1 carries the addresses of the data of the first file. The horizontal axis A2 carries the addresses of the data of the second file. Each cell (m, n) of the array represents a pair of start positions to be evaluated to search for a common extract.

For the example, the size of the first file equals 6 (addresses 0 to 5) and that of the second file equals 10 (addresses 0 to 9). The arrows F in the array indicate the direction of movement which is used to test the whole set of possible pairs of start positions of common extracts to be found.

The example represented in FIG. 2S pertains to the search for common extracts of minimum size 6 between the texts "Un mouton" and "Des moutons". The vertical axis A1 carries the addresses of the data of the first file ("Un mouton"). The horizontal axis A2 carries the addresses of the data of the second file ("Des moutons"). the hatched cells indicate the common extract found "mouton" of size 7 (including the space preceding the word), beginning with the pair of start positions (2, 3).

As the computer programming tools impose constraints on the size of the data arrays that can be used in programs, a computer program employing this algorithm preferentially proceeds to a prior splitting of the files into consecutive data blocks of reduced size (the split takes account of necessary overlaps between blocks making it possible to guarantee the test of the whole set of pairs of start positions of common extracts to be searched for). The algorithm is then applied to the whole set of possible combinations of pairs of data blocks. The order of comparison of the pairs of data blocks is analogous to that described previously, namely via the pairs of start positions of extracts. However, simply here, the comparison pertains to blocks of data rather than pertaining to isolated data. Typically, the first block of the first file is compared with the first block of the second file, then with the subsequent blocks of the second file. The next block of the first file is then compared with the first block of the second file, followed by the subsequent blocks of the second file, . . . , and so on and so forth until the last block of each file is reached.

In terms of performance, the execution time of the search engine program in "full text" mode (that is to say by analysis of the entirety of the content of the files) depends essentially on the number of comparisons to be performed between data. This parameter is the most important one but is not the only one since account must be taken also of the speed of transfer of the data between disk and random access memory (RAM), and then between RAM memory and microprocessor. The minimum number of comparisons to be performed between data to accomplish the search for a common extract of size 1 is equal to the product:

(size of the first file)×(size of the second file)

For the search for common extracts of minimum size n, the search algorithm is optimized so as to eliminate the end-of-file positions from the possible pairs of start positions to be analyzed. In this case, the minimum number of comparisons between data to be performed is reduced to the product:

(size of the first file−n+1)×(size of the second file−+1)

For large size files, the value of this number remains close to that of the product of the sizes of the files.

The program according to the conventional search algorithm uses this value to estimate the total duration and the speed of search by interpolation of the number of pairs of start positions already tested and of the search time elapsed.

The algorithm for searching for common extracts within the meaning of the present invention is now described.

Globally, one seeks to improve the search performance by reducing the number of comparison operations to be performed between data relative to the conventional algorithm. The approach employed here is to perform the searches in two passes. A coarse search on the files which rapidly eliminates file portions which do not comprise any common extracts. A fine search on the remaining file portions using an algorithm much like the conventional algorithm described above. However, as will be seen later in certain cases of files, the second pass is not always necessary and is preferentially used for text files to be compared.

For the coarse search, the algorithm within the meaning of the invention implements an advantageous calculation of digital signatures on the files to be compared. The "digital signatures" may be regarded as files or as arrays of data whose size is less than that of the files from which these signatures emanate.

Digital signatures have the property of being able to be used as indices of the files which are associated with them. Furthermore, a mathematical relation makes it possible to match up any extract of a digital signature with a corresponding precise portion of the file which is associated with it. Moreover, the start position of a digital signature extract matches correspondingly with a fixed number of start positions of extracts on the file which is associated with the digital signature. Conversely, onwards of a certain size of extract, any data extract taken from a file may be associated with an extract of the digital signature. Digital signatures also have the property of being able to be compared with one another to identify common extracts of signatures.

It is indicated however that the definition of the common extracts of digital signatures and the mathematical operations used to perform the comparisons of digital signatures are different from those which were described hereinabove in respect of the search for extracts common to files. The index properties of digital signatures are utilized to interpret the results of the search for common extracts of signatures. Specifically, for a determined pair of start positions (one per digital signature), the absence of any common extract is conveyed mathematically by an absence of common extract between two portions of file (one portion per file associated with each digital signature). Inversely, a common extract found between two digital signatures is conveyed by the possible existence of an extract common to two portions of files (one portion per file associated with each signature).

The search for the extracts common to files is performed only on the file portions which are labeled by the positive results of search for common extracts of digital signatures. Any common extract of digital signatures is labeled by a pair of start positions in each signature, and each signature start position correspondingly matches with a file portion delimited by a fixed integer number (N) of start positions in the file. Each common extract of digital signatures which is found is therefore manifested as a search for common extract between files on a reduced set of (N×N) pairs of start positions to be tested. Inversely, each pair of start positions which is characterized by an absence of common extract of digital signatures is manifested as a saving of search of common extract between files on a set of (N×N) pairs of start positions to be tested.

The calculation of the digital signatures conditions the value of minimum size of the common extracts to be found between files. The fixed number (N) of positions of start of extract on the file matching each digital signature data item is an adjustable parameter of the processing for calculating the digital signatures.

The value of the minimum size of the common extracts of files which may be found with the coarse search algorithm is determined on the basis of this number by means of a mathematical formula that will be described in detail hereinbelow. This value increases as that of the fixed number N of positions increases. Hereinafter, this number N is designated by the term "index ratio".

It will be seen later and in detail that the algorithm for searching for common extracts of digital signatures has some similarities with the conventional algorithm for searching for extracts common to files.

It is indicated simply here that the search strategy implemented is to examine all the possible pairs of start positions that can be taken by a common extract on the two digital signatures to be compared. The minimum size of the common extract of digital signatures to be found is determined by means of a mathematical formula that will be described later, on the basis of the value of the index ratio and of the minimum size of the common extracts of files to be found.

For each value of pair of start positions (one start position per digital signature), a comparison is performed between the extracts which can be lifted from each digital signature.

Thus, globally, the algorithm within the meaning of the invention chains together the following search steps:
 a coarse search between files, with calculation of a digital signature per file to be compared and a comparison of the digital signatures with the search for common extracts of digital signatures, and
 a fine search between files for each common extract found of digital signatures, with an implementation of the conventional algorithm for searching for the common extracts in the portions of files which correspondingly match with the common extracts of digital signatures.

Figure 3:
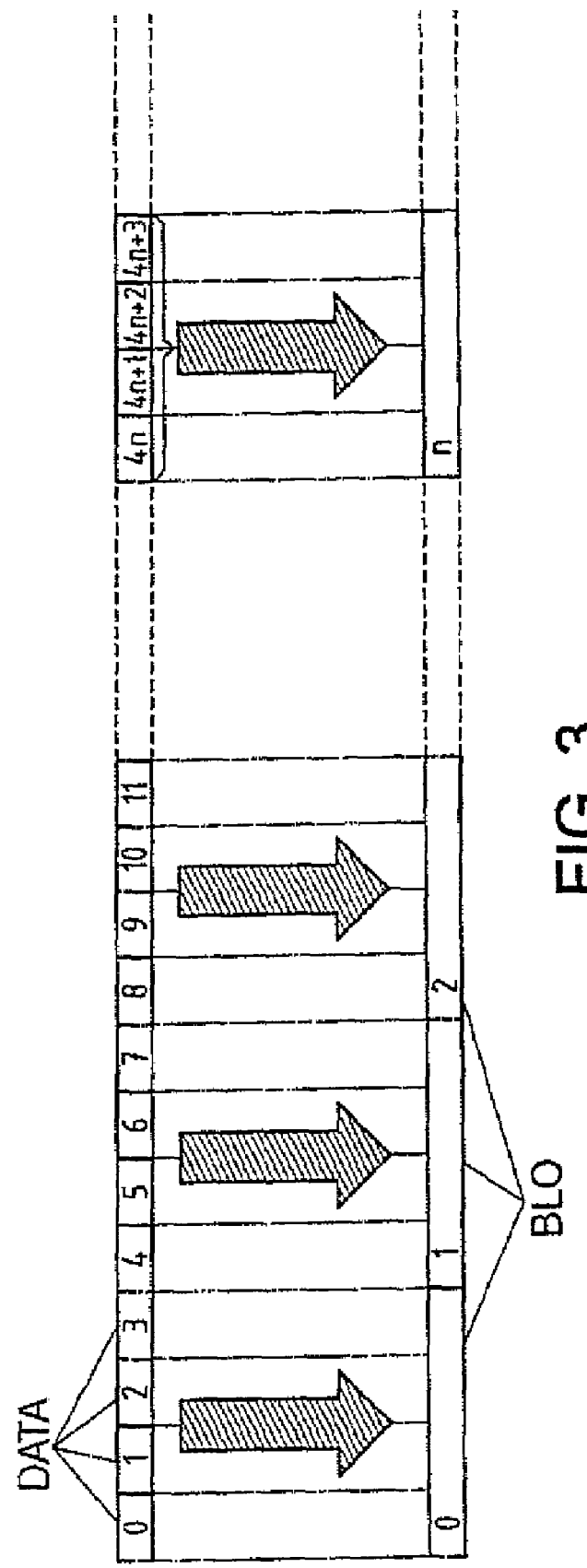
FIG. 3 represents the correspondence between the addresses of data and the addresses of data blocks obtained after formulation of a digital signature, here for an index ratio which equals 4.
Figures 4A, 4B:
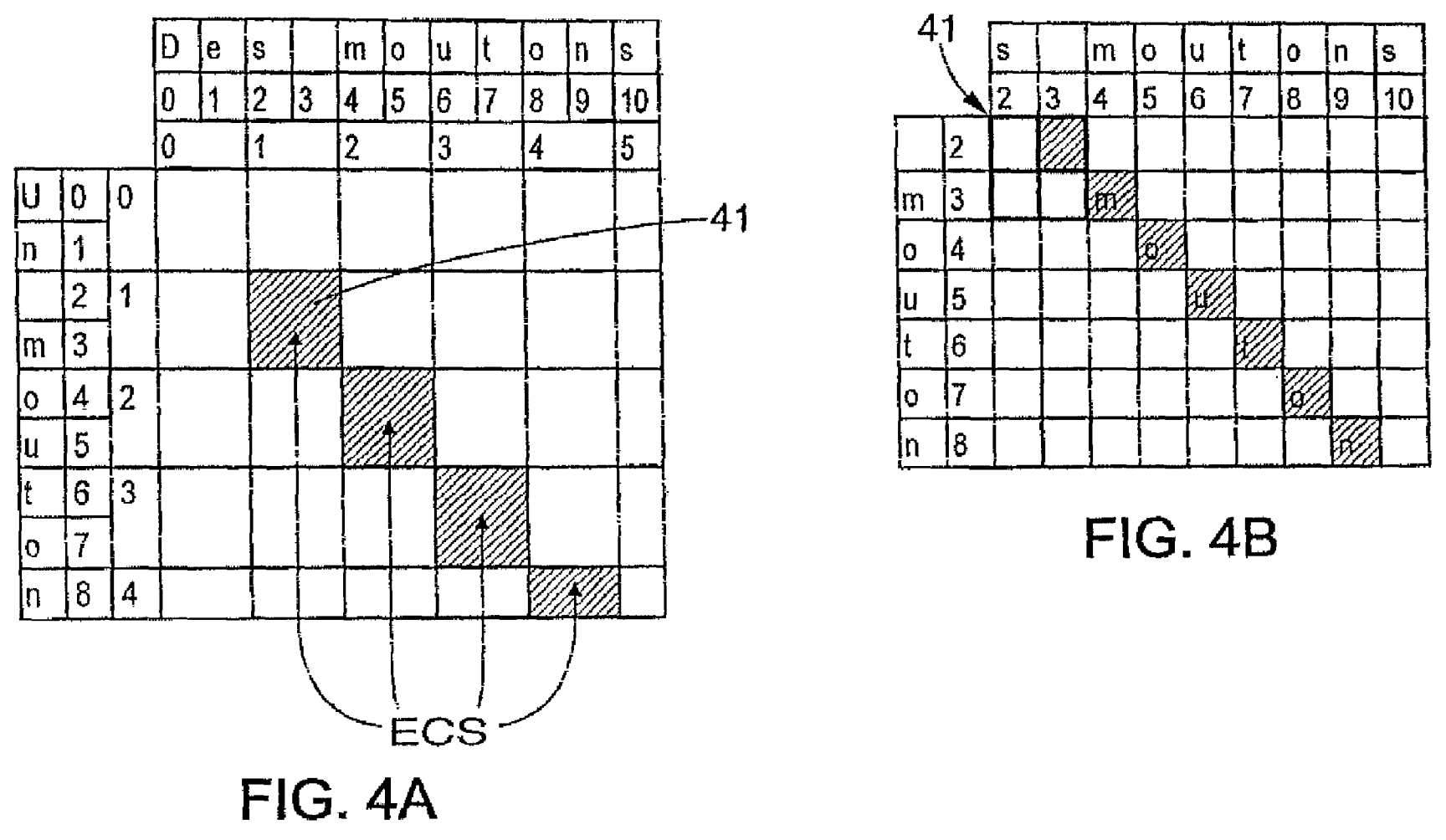

The principle of the algorithm within the meaning of the invention is now described in greater detail. Referring to FIG. 3, the data file DATA is split into consecutive blocks BLO of data whose size is equal to that of the index ratio. Globally, the digital signature calculation associates a signature data item with each block of data of the file. In the illustration of FIG. 3, the index ratio equals 4. Represented in FIGS. 4A and 4B are two dimensional arrays of a search for common extracts of minimum size 6 between the text files "Un mouton" and "Des moutons". In this example, the index ratio equals 2. The digital signature of the first file comprises 5 data. The digital signature of the second file comprises 6 data. The hatched parts of FIG. 4A represent common extracts of digital signatures ECS between the two files (for example the reference 41). Typically, referring to FIG. 4B, this reference 41 corresponds to a reduced search zone of 4 (2×2) pairs of positions of start of extract to be tested on the files. This reduced search zone is associated with the pair (1, 1) of positions of start of common extract of digital signatures.

Operations of calculation and of comparison of the digital signatures are now described in detail.

The calculation of the data of digital signatures uses a mathematical theory of fuzzy logic.

Customarily, binary logic uses a data bit to code two logic states. The code 0 is associated with the state "false", while the code 1 is associated with the state "true".

Binary logic employs a set of logic operations for comparing between binary states, as is represented on the truth tables of FIGS. 5A and 5B.

An 8-bit data item (one byte) can store 8 independent binary states.

Compared to binary logic, fuzzy logic uses two extra states which are the undetermined state "?" (at one and the same time true and at one and the same time false) and the prohibited state "X" (neither true nor false).

The 4 fuzzy logic states are coded on two bits, as is represented in FIG. 5C, where the references B0 and B1 therefore represent a coding of the states on two bits (horizontal axis), while the vertical axis represents the various fuzzy logic states "0", "1", "?", and "X".

An 8-bit data item (one byte) can thus store 4 independent fuzzy states.

Fuzzy logic employs a set of logic operations for comparing between fuzzy states such as represented in FIGS. 5D and 5E, respectively for the fuzzy logic "OR" and the fuzzy logic "AND". The result of these operations is simply obtained by applying a binary OR or AND comparison to each coding bit of the binary components of the fuzzy states.

It is indicated that, in the context of the invention, the calculation of digital signatures uses the OR operation to determine a fuzzy state common to a block of consecutive data of the file associated with the signature. At the outset, a binary state (0 or 1) is associated with each address of a data item, in a block of data of the file. The size of the data block is equal to the index ratio, as indicated hereinabove. The binary states are thereafter intercompared to determine the fuzzy state "0", "1" or "?" of a data item of the digital signature. A digital signature data item is thereafter associated with the data block of the file.

Thereafter, the comparison of the digital signatures, properly speaking, uses the AND operation to determine whether or not it is possible to have an extract common to the files. The decisions are therefore taken as a function of the fuzzy logic state which is taken by the result of the AND operation applied to pairs of data of digital signatures.

The prohibited state X signifies that there is no common extract between the files in the data zones which are associated with the current pair of positions of start of common extract of digital signatures (with one block per digital signature data item). This case will be described in detail later. The states "0", "1" or "?" signify inversely that there is a possibility of common extract between the files in the data zones which are associated with the current pair of positions of start of common extract of digital signatures.

Referring to FIGS. 6A and 6B, the digital signatures are calculated in two steps:
- a step of calculating a binary signature by associating a binary state with each data address of the file. The calculation laws used allow backward association of an extract of file of fixed size with each binary state, and
- a step of calculating a fuzzy signature by intercomparing the states of the binary signature on blocks of size equal to that of the index ratio. Each block of N consecutive binary states determines a fuzzy state.

In the example of FIGS. 6A and 6B, the index ratio N equals 2. In FIG. 6A, the reference Add identifies the respective addresses of the data of the file FIC and the reference Valb identifies the binary states associated respectively with the addresses of these data. In FIG. 6B, the same reference Valb identifies the binary states associated respectively with the same addresses of the data and the reference Valf identifies the fuzzy logic states associated with the data of the digital signature SN drawn from the file FIC. One fuzzy logic state is counted per block of N addresses, where N is the index ratio (here N=2). The succession "?", "0", "?", . . . of the fuzzy logic states Valb of FIG. 6B is typically interpreted thus:
- the binary states "0" and "1" of the first two addresses of the file being different, the fuzzy logic OR operation applied to these states gives "?",
- the binary states "0", and "0" of the third and fourth addresses of the file being equal to "0", the fuzzy logic OR operation applied to these states gives "0",
- the binary states "1" and "0" of the fifth and sixth addresses of the file being different, the fuzzy logic OR operation applied to these states again gives "?", etc.

Examples of calculating digital signatures, with a chosen text, "La tortue", are described hereinbelow. Each character of the text is coded on a byte employing the ASCII code. Each ASCII code is represented by the value of the integer number which is coded by the 8 bits of the byte. This number lies between 0 and 255. The binary states which are associated with each data address are determined, by way of example through a law of the type:
- state 0 if the integer value of the ASCII code of the character is strictly less than 111,
- and state 1 if the integer value of the ASCII code of the character is greater than or equal to 111.

The array of FIG. 7A shows the results which are obtained for the calculation of the fuzzy states of a digital signature with various values of index ratio, from 2 to 4, for the text file "La tortue".

FIG. 7B now shows the results obtained for the calculation of the digital signature fuzzy states with a value of index ratio of 2, on the two text files "Le lièvre" and "La tortue". The address of the data item is that of the start position of the extract. The law for determining the binary states is the one described hereinabove (ASCII value compared with 111).

Represented in FIG. 7C is a two dimensional array of a search for common extracts between the text files "Le lièvre" and "La tortue", with an index ratio of 2. The law for determining the binary states which are associated with each data address is identical to that stated hereinabove (ASCII values to be compared with 111). The initials AD1 and AD2 reference the addresses of respective blocks drawn from the file "Le lièvre" and from the file "La tortue" and the initials SN1 and SN2 reference the successive fuzzy logic states of these respective blocks. The unhatched cells indicate the positions for which there is no common extract of size 1 between the file portions which are associated with the digital signatures data.

The hatched cells indicate conversely the situations for which there may be a common extract of minimum size 1 between the file portions which are associated with the digital signatures data.

Described hereinbelow are the mathematical laws used for the calculation of the digital signatures, in a preferred embodiment. The description which follows supplements the first aforesaid step of calculating a binary signature of the search algorithm within the meaning of the invention and describes the mathematical laws which are used to determine the binary states which are associated with each data address of the file. In the examples above, each binary state of digital signature is determined by a simple law which rests upon the comparison of the integer value of the code of each byte of the file with an integer reference value. The benefit of this law is limited however, since each binary signature data item characterizes only a single data item of a file at a time. The interpretation of the result of the comparisons between data of fuzzy signatures (which are obtained in the second step of the calculation) is thus limited to the possible existence of extracts common to the files of size 1. The possible absence or existence of an extract common to the files of size greater than 1 cannot be detected by a single operation of comparison between fuzzy signature data. To remedy this situation, the mathematical laws for determining the states of the binary signature are chosen in such a way that each data item of a binary signature characterizes an extract of preferentially fixed size of the file. The size of the data extracts is a parameter of the mathematical law for determining the states of the binary signature. The value of this parameter is always greater than or equal to that of the index ratio. By virtue of this condition, the result of a comparison between a pair of fuzzy signatures data may be interpreted either through the absence or through the possible existence of a common extract of file of size at least equal to the index ratio (N) from among the set (N×N) of pairs of positions of start of common extract of file which is associated with the pair of fuzzy signatures data.

Likewise, a common extract found of size K between digital signatures is interpreted through the possible existence of a common extract of file of size at least equal to N×K from among the set (N×N) of pairs of positions of start of common extract of file which is associated with the pair of start positions of the common extract found of digital signatures.

It will also be understood that the proportion of "?" fuzzy states increases as the size of the index ratio increases. Consequently, the step of searching for common extracts between digital signatures becomes much less selective when the index ratio increases. Specifically, if the data of a digital signature are all equal to the "?" state, the comparison of this signature with another digital signature will not eliminate any pair of start positions of extract to be searched for on the files which are associated with the signatures. To remedy this situation, the law for determining the binary states must be chosen in such a way that the step of calculating the fuzzy states (by comparing blocks of binary states) generates a small proportion of "?" states and inversely a high proportion of "0" or "1" states.

Described hereinbelow is a processing for improving the selectivity of the digital signatures. The explanations which follow use results of mathematical theories from the areas of the algebra of transformations and digital signal processing.

It is recalled that the Fourier transformation is a mathematical transformation which matches a function f(t) of the variable t with another function F(f) of the variable f according to the following formula:

$$F(f) = \int_{-\infty}^{+\infty} f(t)e^{-2i\pi ft}dt$$

A property of the Fourier transformation is reciprocity, making it possible to obtain the function f(t) backwards from F(f) through the following formula:

$$f(t) = \int_{-\infty}^{+\infty} F(f)e^{2i\pi ft}df$$

This formula indicates that any real function f(t) may be decomposed into an infinite sum of pure cosinusoid functions of frequency f, of amplitude 2·|F(f)| and of phase φ(f).

$$f(t) = \int_{0}^{+\infty} 2|F(f)|\cos(2\pi ft) + \varphi(f))df \text{ with } F(f) = |F(f)|e^{i\pi\varphi(f)}$$

The variations of the function cos(2πft+φ) are represented in FIG. 8A for various values of the phase φ. The function is periodic and its period T is equal to 1/f. It is positive over intervals of size T/2 and negative over complementary intervals of size T/2.

The latter property will be exploited for the choice of the laws for determining the binary signatures. A law $State_s(t,p)$ for determining fuzzy states with two variables is associated with the function s(t)=cos(2πft+φ). We put T=1/f.

The law $State_s(t,p)$ is defined for any real value of t and for any positive real value of the parameter p (to be compared with the aforesaid index ratio):

$State_s(t,p)=1$ if $\forall x \in [t,t+p], s(x)>0$ $State_s(t,p)=0$ if $\forall x \in [t,t+p], s(x)<0$ $State_s(t,p)=?$ otherwise Represented in FIG. 8B is a cosinusoid function where p is around 0.6 T. For any interval [t, t+p], the function s(t) takes both positive and negative values, so that $State_s(t,p)=?$. Thus, if the parameter p is larger than T/2, we will have "$State_s(t,p)=?$", for any t.

Represented in FIG. 8C are the fuzzy states of the law $State_s(t,p)$ for fixed values of p now lying between 0 and T/2 (p=0.3 T in the example represented). The probabilities of drawing the fuzzy states are obtained by logging over an interval of size equal to the period T (T=1/f) the aggregate size of the intervals of the variable t which produce each possible fuzzy state (0, 1 or ?), then by dividing this aggregate size by T.

Hereinbelow, the following notation is used:
probability of drawing the state 1:P1(f,p)
probability of drawing the state 0:P0(f,p)
probability of drawing the state ?:P?(f,p)
The following results are obtained for the law $State_s(t,p)$:
For p∈[0,T/2]

$P1(f,p)=P0(f,p)=(T/2-p)/T=\frac{1}{2}-p/T=\frac{1}{2}-pf$ $P?(f,p)=1-P1(f,p)-P0(f,p)=2pf$ For p greater than T/2

$P1(f,p)=P0(f,p)=0$ $P?(f,p)=1$

It is again recalled that the probabilities of drawing the fuzzy states were obtained after applying the law State s(t,p) for determining the fuzzy states to the function s(t)=cos(2πft+φ). It will also be remarked that the probability of drawing the fuzzy states does not depend on the phase φ of the function s(t)=cos(2πft+φ).

Referring to FIGS. 9A, 9B and 9C, the graphical representation of the variations of the probabilities P1(f,p) P0(f,p) and P?(f,p) as a function of frequency shows that the probability of drawing states 1 and 0 grows as the frequency f decreases. Inversely, the probability of drawing the state "?" grows as the frequency f increases.

We will now seek to apply this observation to the comparison of binary data within the meaning of the invention.

The sampling of a function f(t) of the variable t consists in logging the values which are taken by this function at instants $T_n$ which are spaced apart by a fixed interval Te.

The following notation is used:
n sample number (integer lying between −∞ and +∞)
$T_n$ instant of sample n: $T_n$=n·Te
$f_n$ value of sample n: $f_n$=f($T_n$)

In the theory of signal processing, Shannon's theorem shows that the original of a function f(t) can be obtained backwards from the samples $f_n$ if the frequency spectrum of the Fourier transform F(f) associated with f(t) is strictly bounded by the interval [−Fe/2, Fe/2], with Fe=1/Te.

Under this condition, the function f(t) is obtained after applying an ideal low-pass filtering in the frequency band [−Fe/2, Fe/2] to the Fourier transform of the sampled signal F(f).

In what follows, it is considered that the data files exhibit samples $f_n$ of a function f(t) which satisfies the above conditions. In particular, each data address corresponds to a sample number n. Each data item stores the value of a sample (typically an integer coded on the bits of a byte).

The Fourier transform of the signal associated with the samples $f_n$ of a data file is as follows:

$$\hat{F}(f) = \int_{-\infty}^{+\infty} \hat{f}(t)e^{-2i\pi ft}dt, \text{ with}$$

$$\hat{f}(t) = f_n \text{ for } t = T_n \text{ and}$$

$$\hat{f}(t) = 0 \text{ for } t \neq T_n (\text{where } T_n = nTe)$$

It will be noted that the choice of the sampling period Te is free here.

The Fourier transform is also expressed in this case by the following simplified formula:

$$\hat{F}(f) = \sum_{n=0}^{n=N} f_n e^{-2i\pi fT_n}$$

with N + 1 = size of the data file

The Fourier transform F(f) of the original of the function f(t) which is associated with the samples $f_n$ is obtained by applying Shannon's theorem:

$F(f)=\hat{F}(f)/Fe$ for $f \in [-Fe/2, Fe/2]$ $F(f)=0$ for the other values of $f$ The function f(t) which is associated with the samples $f_n$ is obtained by applying the inverse Fourier transform.

$$f(t) = \int_{-\infty}^{+\infty} F(f)e^{2i\pi ft} df = \int_{-Fe/2}^{Fe/2} (F(f)/Fe)e^{2i\pi ft} df$$

$$= \int_{-Fe/2}^{Fe/2} \left( \sum_{n=0}^{n=N} (f_n/Fe)e^{-2i\pi fT_n} \right) e^{2i\pi ft} df$$

$$= \sum_{n=0}^{n=N} (f_n/Fe) \int_{-Fe/2}^{Fe/2} e^{2i\pi f(t-nTe)} df$$

$$= \sum_{n=0}^{n=N} f_n \left[ \frac{e^{2i\pi f(t-nTe)}}{2i\pi Fe(t-nTe)} \right]_{-Fe/2}^{Fe/2}$$

and is finally expressed in the form of a finite sum of terms as:

$f(x)=\sin(x)/x$, or $x=\pi Fe(t-nTe)$, i.e.:

$$f(t) = \sum_{n=0}^{n=N} f_n \frac{\sin(\pi Fe(t-nTe))}{\pi Fe(t-nTe)} = \sum_{n=0}^{n=N} f_n(t)$$

Represented in FIG. 10 is an exemplary representation of the function f(t) associated with the data of the text file "Le lièvre", as a function of the ratio t/T.

It is indicated that the above relations between a function f(t) and a set of samples $f_n$=f(nTe) apply for any function which satisfies the Shannon conditions.

They therefore also apply for the function s(t)=cos(2πft+φ) if the following condition holds:

f∈[−Fe/2,Fe/2]

It is then possible to represent s(t) by an infinite set of samples $s_n$ taken over s(t) at the instants $t_n$=nTe.

We recall the law $State_s(t,p)$ defined above for any real value of t and for any positive real value of p:

$State_s(t,p)=1$ if $\forall x \in [t,t+p], s(x)>0$ $State_s(t,p)=0$ if $\forall x \in [t,t+p], s(x)<0$ $State_s(t,p)=?$ otherwise The properties of this law may be transposed simply into the domain of the samples $s_n$ if we are interested in the following law for determining fuzzy states, defined over a sequence of k consecutive samples $\{s_n, s_{n+1}, \ldots, s_{n+k+1}\}$.

$State_s(n,k)=1$ if $\forall i \in \{0,k-1\}, s_{n+i}>0$ $State_s(n,k)=0$ if $\forall i \in \{0,k-1\}, s_{n+i}<0$ $State_s(n,k)=?$ otherwise The probabilities of drawing the fuzzy states associated with the law $State_s(n,k)$ are obtained simply on the basis of the law $State_s(t,p)$ by replacing p by (k−1)Te.

We thus obtain the graphical representation of the probabilities of drawing the states 1 or 0 of the law $State_s(n,k)$ as a function of the frequency of the function s(t) associated with the samples $s_n$.

In the example of FIG. 11, k is fixed at 3. The probability of drawing 3 consecutive samples of s(t) such that s(nTe), s((n+1)Te), s((n+2)Te) are greater than 0 is given by P1(f,3), which is zero for f greater than ½p with p=(3−1)Te=2/Fe, i.e. for f>Fe/4.

The definition of the laws for determining fuzzy states will be extended to the case of any function f(t) which satisfies Shannon's conditions. In this general case, the law $State_f(t,p)$ is defined for any real value of t and for any positive real value of p:

$State_f(t,p)=1$ if $\forall x \in [t,t+p], f(x)>0$ $State_f(t,p)=0$ if $\forall x \in [t,t+p], f(x)<0$ $State_f(t,p)=?$ otherwise This law for determining the fuzzy states is also transposed into the domain of the samples $f_n$ over sequences of k consecutive samples $\{f_n, f_{n+1}, \ldots, f_{n+k-1}\}$.

$State_f(n,k)=1$ if $\forall i \in \{0,k-1\}, f_{n+i}>0$ $State_f(n,k)=0$ if $\forall i \in \{0,k-1\}, f_{n+i}<0$ $State_f(n,k)=?$ otherwise Contrary to the particular case already treated where f(t) is a pure sinusoid of frequency f, there is no simple mathematical relation which makes it possible here to calculate the probabilities of drawing fuzzy states on the basis of the Fourier transform F(f).

On the other hand, we can harness the properties of the probabilities of drawing the fuzzy states associated with the laws $State_s(n,k)$ and $State_s(t,p)$ to deduce that the application of a low-pass filtering to any function f(t) is conveyed by the increasing of the probabilities of drawing the states 0 and 1 and by the decreasing of the probability of drawing the state ? which are associated with the laws $State_f(n,k)$ and $State_f(t,p)$.

In the case of the law $State_f(n,k)$, we know that if the function f(t) is a pure sinusoid of frequency f, we will have f>Fe/2(k−1) and k>1

$P1(f,k)=P0(f,k)=0$ $P?(f,k)=1$

If we apply an ideal low-pass filtering in the frequency band [−Fe/2(k−1), Fe/2(k−1)] to a function f(t), it is understood that the probabilities of drawing the states 1 and 0 will increase since each frequency component $R_k(f)$ of the result signal $r_k(t)$ contributes to the final result with a non zero individual probability of drawing the states 0 or 1.

This assertion can be demonstrated in the case of a random noise function b(t) for which the amplitude of the spectrum B(f) is constant in the frequency band [−Fe/2, Fe/2] In the case of a random noise function b(t), we know that the probabilities of drawing a sample are:

$P1_b(k=1)=P0_b(k=1)=½$ $P?_b(k=1)=0$

For 2 consecutive samples, we obtain:

$P1_b(k=2)=P0_b(k=2)=(½)^2$ $P?_b(k=2)=1-P1_b-P0_b=1-2\times(½)^2$

And for n consecutive samples, we obtain:

$P1_b(k=n)=P0_b(k=n)=(½)^n$ $P?_b(k=n)=1-P1_b-P0_b=1-2\cdot(½)^n$

Thus, for a large number of successive samples, the probabilities of drawing the states "0" and "1" tend to 0 while the probability of drawing the undetermined state "?" tends to 1. We now consider a function $r_n(t)$ which is obtained by applying an ideal low-pass filtering to the function b(t) in the frequency band [−Fe/2(n−1), Fe/2(n−1)]. We have then observed that the representation of the spectra of $R_n(f)$, of $P1(f,n)$, of $P0(f,n)$ and de $P?(f,n)$ is obtained by simple homothety of the spectra of $R_2(f)$, of $P1(f,2)$, of $P0(f,2)$ and of $P?(f,2)$, as shown by FIGS. 12A and 12B. Also represented in FIG. 12A is the amplitude of the spectrum B(f) associated with the function b(t). Also represented in FIG. 12B is the amplitude of the spectrum $R_n(f)$ associated with $r_n(t)$.

From this we deduce that there is equality between the probabilities of drawing n consecutive samples of the filtered noise signal $r_n(t)$ and the probability of drawing 2 consecutive samples of the unfiltered noise signal b(t). The probabilities of drawing a 1 state or a 0 state for n consecutive samples of the filtered noise signal $r_n(t)$ equal ¼, while the probability of drawing a "?" state for n consecutive samples of the filtered noise signal $r_n(t)$ equals ½.

In conclusion, the selectivity of the digital signatures is improved by applying a low-pass filtering to the function f(t) which is associated with the samples $f_n$=f(nTe).

The processing steps and the relations between data of files, samples and functions may be summarized as represented in FIG. 13. In step 131, the data $d_n$ of a file to be processed are retrieved and are sampled in step 132 to obtain the samples $f_n$ which are integer numbers coded by the data $d_n$. According to Shannon's theorem (step 132'), these samples are associated with a function f(t) of bounded spectrum F(f) and:

$$F(f)=0 \text{ for } f \notin [-Fe/2, Fe/2]$$

By applying a low-pass filter (step 135') to this function F(f), we obtain the function R(f) corresponding to the Fourier transform of the function r(t) (step 133') whose samples r, are such that $r_n$=r(n·Te)=r(n/Fe) according to Shannon's theorem (step 133).

In practice, in step 135 a low-pass digital filter will preferentially be applied directly to the samples $f_n$ to obtain the samples $r_n$ in step 133. This digital filter will be described in detail later. Finally, a law for determining fuzzy states is applied to the filtered samples $r_n$ to obtain the digital signature data $s_{n/k}$=State$_r$(n,k), over k consecutive samples {$r_n$, $r_{n+1}$, ..., $r_{n+k-1}$}, n being a multiple of k (step 134).

As indicated hereinabove, these steps of FIG. 13 may nevertheless be simplified by performing the calculation of the samples $r_n$ directly on the basis of the samples $f_n$, using a digital filter.

In what follows, the following notation is adopted:

Filter(f): Fourier transform of the filtering operator filter(t): the function associated with Filter(f) by applying the inverse Fourier transform Borel's theorem gives the relation:

$$R(f)=\text{Filter}(f) \times F(f)$$

This relation is conveyed on the functions r(t), filter(t) and f(t) by a formula of the type:

$$r(t) = \int_{-\infty}^{+\infty} f(u) \times \text{filter}(t-u)\,du = \int_{-\infty}^{+\infty} f(t-u) \times \text{filter}(u)\,du$$

If we consider the functions which are associated with the samples (and which satisfy Shannon's conditions), this relation becomes:

$$r_n = r(nTe)$$

$$= \sum_{k=-\infty}^{k=+\infty} f(nTe - kTe) \times \text{filter}(kTe)$$

$$= \sum_{k=-\infty}^{k=+\infty} f_{(n-k)} \times \text{filter}_k$$

The digital filtering therefore consists in defining a set of coefficients filter$_k$ that will be used to calculate each sample $r_n$ by applying the above formula.

In practice, we try to approximate a predefined filter template by limiting the size of the set of coefficients filter$_k$. The compromise to be found depends on the following factors:

the accuracy of the filter produced improves as the number of coefficients of the digital filter increases, inversely, the speed of calculation of the samples $r_n$ decreases as the number of coefficients increases.

If the number of coefficients equals K, each calculation of a sample $r_n$ is conveyed by K multiplication operations and by (K−1) addition operations.

For the digital filters used by the search algorithm within the meaning of the invention, the main criterion adopted is the speed of calculation of the samples $r_n$.

In a preferred embodiment, the choice pertains to a particular family of filters termed "mean value" filters for which the coefficients of the digital filter are identical, so that:

filter$_k$=Cst for k integer $\in[-K,K]$ filter$_k$=0 for the other values of k

The equation of the digital filter simplifies into the following form:

$$r_n = Cst \times \sum_{k=-K}^{k=+K} f_{(n-k)}$$

For this filter with 2K+1 coefficients, the calculation of a sample $r_n$ is thus now conveyed by only 2K+1 addition operations, and by a multiplication operation if the term Cst is different from the value 1.

It is remarked moreover that the sample $r_{(n+1)}$ may be obtained simply from $r_n$ through the relation $r_{(n+1)}=r_n+Cst(f_{(n+K+1)}-f_{(n-K)})$ In a particularly advantageous manner, by applying this latter relation, the calculation of each new sample $r_{(n+1)}$ is now conveyed by only two addition operations.

The frequency response of the mean value digital filter is obtained from the Fourier transform of the following summation operator σ(t):

σ(t)=1 for t$\in[-T/2,T/2]$

σ(t)=0 elsewhere

The filtering of f(t) by the operator σ(t) is then conveyed by the formula:

$$r(t) = \int_{-\infty}^{+\infty} f(t-u) \times \sigma(u)\,du = \int_{-T/2}^{T/2} f(t-u)\,du$$

The frequency response of the operator σ(t) is Σ(f) with:

$$\sum(f) = \int_{-\infty}^{+\infty} \sigma(t)e^{-2i\pi ft} dt = \int_{-T/2}^{T/2} e^{-2i\pi ft} dt$$

We finally obtain:

$$\sum(f) = T\frac{\sin(\pi fT)}{\pi fT}$$

The frequency response of the mean value filter is obtained by subsequently dividing that of the summation operator Σ(f) by T.

$$\text{Filter}(f) = \sum avg(f) = \sum(f)/T = \frac{\sin(\pi fT)}{\pi fT}$$

The frequency response of the mean value digital filter over K consecutive samples is thereafter obtained by replacing T by (K−1)Te, i.e.:

$$\text{Filter}(K,f) = \sum avg(K,f) = (K-1)Te\frac{\sin(\pi f(K-1)Te)}{\pi f(K-1)Te}$$

According to the parity of K, two equations for a digital filter are used for the calculation of the samples $r_n$.

$$\text{For } K \text{ odd we have: } r_n = (1/K) \times \sum_{k=-K/2}^{k=+K/2} f_{(n+k)}$$

$$\text{For } K \text{ even we have: } r_n = (1/K) \times \sum_{k=-K/2}^{k=(K/2)-1} f_{(n+k)}$$

Represented in FIG. 14 are exemplary plots of Filter(K,f)= Σavg(K,f) for a few values of K, as a function of f/Fe. The first cutoff of the filter at zero occurs for f=Fe/(K−1).

We know moreover that the application of an ideal low-pass filtering in the frequency band [−Fe/2(n−1), Fe/2(n−1)] is conveyed by the following probabilities of drawing fuzzy states calculated over sequences of n consecutive samples:

P1=P0=¼

P?=½

We can approximate an ideal low-pass filtering template by choosing a mean value digital filter whose zero cutoff frequency occurs at f=Fe/2(n−1): this condition is attained for K=2n−1.

In practice, the application of a mean value digital filter is of course conveyed by probabilities of drawing fuzzy states which differ from the probabilities obtained with an ideal low-pass filter. The determination of the value of K is done empirically knowing that the probabilities obtained with K=2n−1 will be close to those of the ideal filter, and that the probabilities of drawing P1 and P0 also increase with the value of K.

Described hereinbelow are the adaptations made to the laws for determining fuzzy states, in particular as a function of the foregoing.

The calculations of probabilities on the drawing of fuzzy states are based on the hypothesis that the data of files represent the values of samples of a signal f(t) of zero mean value. This condition is again conveyed by the following relation:

$$\int_{-\infty}^{+\infty} f(t)dt = 0$$

The results obtained on the probabilities of drawing fuzzy states are therefore valid only if this condition is satisfied for the samples $f_n$:

$$\sum_{n=-\infty}^{n=+\infty} f_n = 0$$

In the case of a file of samples of size N, this condition becomes:

$$\sum_{n=0}^{n=(N-1)} f_n = 0$$

Now, the above conditions of zero mean value are not systematically satisfied when the values of the samples are determined from the binary data of a file. These conditions are for example not satisfied if the "unsigned integer" coding law is used to represent the values of the samples associated with the data of a file. Specifically, in this case each byte represents an integer lying between 0 and 255, this leading to a mean sample value of 127.5 for a file of random content.

To alleviate this problems a reference value parameter Vref is introduced as follows into the law for determining fuzzy states over the sequences of k consecutive samples $r_n$ {$r_n$, $r_{n+1}$, ..., $r_{n+k-1}$} which were obtained by digital filtering on the basis of the samples $f_n$:

State$_r(n,k)$=1 if $\forall i \in \{0,k-1\}, r_{n+i} >= V\text{ref}$

State$_r(n,k)$=0 if $\forall i \in \{0,k-1\}, r_{n+i} < V\text{ref}$

State$_r(n,k)$=? otherwise

The choice of the value Vref is then made so as to best approximate the mean value taken by the samples $f_n$ of the data file.

In the case where the search application is targeted at the comparison of files of like nature, such as for example text files, the value of Vref must be fixed in full knowledge of the law for coding the data of the file and the probabilities of drawing each code.

For the embodiment of the full text computer search program, in a preferred embodiment, it is considered that the format of the files to be compared is not known in advance. The value of Vref is therefore determined by carrying out a prior analysis of the files to be compared. For this embodiment, the value of Vref is calculated for each sample $r_n$ by performing a mean value calculation for the samples $f_k$ over a sequence of fixed size, Kref, centered on $f_n$, with:

$$Vref_n = (1/Kref) \times \sum_{k=-Kref/2}^{k=+Kref/2} f_{(n+k)}$$

Knowing that the samples $r_n$ were already obtained by a mean value calculation over sequences of K consecutive samples $f_k$, the size of the sequence Kref (used for the calculation of $Vref_n$) is chosen greater than that of K (used for the calculation of the samples $r_n$).

The law for determining the fuzzy states over the sequences of k consecutive samples $r_n$ $\{r_n, r_{n+1}, \ldots, r_{n+k+1}\}$ then becomes:

State$_r(n,k)$=1 if $\forall i \in \{0,k-1\}, r_{n+i} \geq Vref_{n+i}$

State$_r(n,k)$=0 if $\forall i \in \{0,k-1\}, r_{n+i} < Vref_{n+i}$

State$_r(n,k)$=? otherwise

This law simplifies by putting $r'_n = (r_n - Vref_n)$. Then:

State$_r(n,k)$=1 if $\forall i \in \{0,k-1\}, r'_{n+i} \geq 0$

State$_r(n,k)$=0 if $\forall i \in \{0,k-1\}, r'_{n+i} < 0$

State$_r(n,k)$=? otherwise

For K even and Kref even, the formula for the digital filter is:

$$r'_n = (1/K) \sum_{k=-K/2}^{k=(K/2)-1} f_{(n+k)} \cdot (1/Kref) \sum_{k=-Kref/2}^{k=(Kref/2)-1} f_{(n+k)}$$

We recall that the frequency response of the digital filter associated with the calculation of the samples $r'_n$ is obtained simply from that of $\Sigma avg(K,f)$:

Filter$(f)$=$\Sigma avg(K,f)$−$\Sigma avg(Kref,f)$

The choice of the value of K is made in such a way that the zero cutoff frequency of the filter is less than or equal to that which would have to be used for an ideal low-pass filter which makes it possible to obtain probabilities of drawing 1 or 0 states equal to ¼. It is recalled that this ideal low-pass filter cutoff frequency is obtained as a function of the index ratio k by the formula Fe/(2·(k−1)) and that this condition is attained on $\Sigma avg(K,f)$ for K smaller than or equal to 2k−1. The choice of Kref is made in such a way as to be greater than K, without now being too high.

For the preferential embodiment of the full text computer search program, the values to be used for K and Kref are adjusted automatically as a function of the value k desired for the index ratio. The values of K and of Kref are chosen as a multiple of k, thereby facilitating the data address calculations, hence:

K=interv×k and Kref=intervref×k

The response of the adjusted digital filter for an index ratio k is

Filter$(k,f)$=$\Sigma avg(interv \times k,f)$−$\Sigma avg(intervref \times k,f)$ For the embodiment of the full text computer search program, four laws for determining fuzzy states are used simultaneously, in a particular embodiment.

The fuzzy states determined by the first law are coded on the 2 least significant bits of each digital signature data item.

The fuzzy states determined by the second law are coded on the next 2 least significant bits of each digital signature data item, and so and so forth, until the 8 bits (hence 1 byte) of each digital signature data item are occupied completely.

The four laws are characterized by a set of parameters interv1, interv2, interv3, interv4 and intervref. The same parameter intervref is used for each law. For an index ratio k, the default choice falls on the following set of digital filters associated with each law for determining fuzzy states:

Filter1$(k,f)$=$\Sigma avg(2k,f)$−$\Sigma avg(14k,f)$

Filter2$(k,f)$=$\Sigma avg(3k,f)$−$\Sigma avg(14k,f)$

Filter3$(k,f)$=$\Sigma avg(5k,f)$−$\Sigma avg(14k,f)$

Filter4$(k,f)$=$\Sigma avg(7k,f)$−$\Sigma avg(14k,f)$

FIG. 15 illustrates the frequency response of the default digital filters adjusted for an index ratio k=5. The formulae for the default digital filters adjusted for an index ratio k are:

$$r1_n = (1/2k) \sum_{k=-2k/2}^{k=(2k/2)-1} f_{(n+k)} - (1/14k) \sum_{k=-7k}^{k=7k-1} f_{(n+k)}$$

$$r2_n = (1/3k) \sum_{k=-3k/2}^{k=(3k/2)-1} f_{(n+k)} - (1/14k) \sum_{k=-7k}^{k=7k-1} f_{(n+k)}$$

$$r3_n = (1/5k) \sum_{k=-5k/2}^{k=(5k/2)-1} f_{(n+k)} - (1/14k) \sum_{k=-7k}^{k=7k-1} f_{(n+k)}$$

$$r4_n = (1/7k) \sum_{k=-7k/2}^{k=(7k/2)-1} f_{(n+k)} - (1/14k) \sum_{k=-7k}^{k=7k-1} f_{(n+k)}$$

To avoid the calculation noise caused by the divisions, in an advantageous embodiment, we firstly calculate the sums, then we subsequently perform the sign tests on terms $r_n$ by multiplying the first sum by Kref and the second sum by K.

We now describe a complete optimization for the application to a full text search engine.

This optimization begins with the determination of an appropriate index ratio.

To be independent of the particular choices which could be made for the embodiment of the low-pass digital filters (FIG. 13), we use the following general equation for the digital filter:

$$r_n = \sum_{i=-I1}^{i=+I2} filter_i \times f_{(n+i)}$$

As indicated in relation to FIG. 13, each digital signature data item $s_{n/k}$ is determined on the basis of a group of k consecutive samples $\{r_n, r_{n+1}, r_{n+2}, \ldots, r_{n+k+1}\}$, k designating the value of the index ratio and n being chosen to be a multiple of k. This determination may be decomposed into two steps:

the determination of a binary state $eb_n$ associated with each sample $r_n$, with:

$eb_n$=0 if $r_n<0$, and $eb_n$=1 otherwise determination of a fuzzy state $s_{n/k}$ by a logic OR on the group of consecutive binary states $\{eb_n, eb_{n+1}, eb_{n+2}, \ldots, eb_{n+k+1}\}$:

$s_{n/k}$=($eb_n$ or $eb_{n+1}$ or $eb_{n+2}$ or $\ldots$ or $eb_{n+k+1}$)

Illustrated in FIG. 16A are the relations between data addresses of a file and data addresses of digital signatures. It is observed that in the case of a choice of index ratio k, each digital signature data item of address (n/k) is determined on the basis of a group of (I1+k+I2) file data: $\{f_{n-I1}, \ldots, f_{n+I2+k-1}\}$. It will also be noted that in the case where the addresses used for the calculation of the samples $r_n$ overflow the span of the data of the file to be indexed, the associated states $eb_n$ are initialized to the "?" fuzzy state. In FIG. 16a, the samples $f_n$ are drawn from the data of the file. The digital filtering is then applied to them to obtain the corresponding filtered samples $r_n$ matching the associated states $eb_n$. The fuzzy states $s_{n/k}$ corresponding to the digital signature data are then determined by comparison involving the logic OR:

$$s_{n/k} = (eb_n \text{ or } eb_{n+1} \text{ or } eb_{n+2} \text{ or } \ldots \text{ or } eb_{n+k+1})$$

while advantageously complying with the same start addresses of the samples $f_n$.

For the application to the full text search engine, the value k of the index ratio conditions the value of minimum size of extracts common to two files which may be detected by carrying out a search of common extracts of digital signatures. This minimum size of common extract of a file is obtained when the size of the extract common to the digital signatures is equal to 1. In this case, the condition for detecting the common file extract requires that the group of consecutive data of the extract to be found covers the group of consecutive data used for the calculation of each digital signature data item.

Taking the notation $t_{ext}$ for the size of common file extract to be found and $t_{sign}$ for the size of the group of data used for the calculation of an index data item, we demonstrate the relation $t_{ext} \geq t_{sign} + (k-1)$.

Represented in FIG. 16B are the conditions of overlap of the data associated with the calculation of a digital signature data item by those of a file extract. In FIG. 16B, the reference EXT designates a data extract which satisfies the overlap condition for the data group used to determine the digital signature data item of address (n/k). The reference G1 designates the data group used to determine the digital signature data item of address (n/k). The reference G2 designates the data group used to determine the digital signal data of respective addresses (n/k)−1 and (n/k). The reference ADSN designates the addresses of the digital signature data. It is recalled that the integer n is a multiple of the index ratio k.

It is observed that the overlap conditions depend on the phase of the start address of the data extract which will be searched for. In the most favorable case, the start address of the extract coincides with the address of the first data item of a data group used for the calculation of a digital signature data item. In this case, the start address of the extract is n−I1 (with n a multiple of k) and the minimum size of the extract for overlap is I1+I2+k. In the least favorable case, the start address of the extract coincides with the address +1 of the first data item of a data group used for the calculation of a digital signature data item. In this case, the start address of the extract is n−I1−(k−1) (with n a multiple of k) and the minimum size of the extract for overlap equals I1+I2+k+(k−1).

In all cases, the overlap condition for a data group used for the calculation of a single digital signature data item is satisfied if the size of the extract to be found is greater than or equal to (I1+I2+2k−1). Conversely, if the size of extract to be found is equal to (I1+I2+2k−1), the extract does indeed overlap a data group used for the calculation of a single data item of a digital signature.

The reasoning can be extended to the case of the overlapping of a data group used for the calculation of an extract of digital signatures data of size TES. In the most favorable case, the start address of the extract coincides with the address of the first data item of a data group used for the calculation of TES consecutive data of the digital signature. If the start address of the extract equals n−I1 (with n a multiple of k), the minimum size of the extract for overlap equals I1+I2+k·TES.

In the least favorable case where the start address of the extract coincides with the address +1 of the first data item of a data group used for the calculation of TES data of a digital signature, the start address of the extract equals n−I1−(k−1) (with n a multiple of k) and the minimum size of the extract for overlap=I1+I2+k·TES+(k−1).

In all cases, the overlap condition for a data group used for the calculation of TES consecutive data of a digital signature is satisfied if the size of the extract to be found is greater than or equal to (I1+I2+k(TES+1)−1).

On the basis of the above formulae, inverse reasoning is applied to determine the values of the index ratio k which can be used to search for a common extract of files of size TEF. The following relations must then be satisfied:

$$TEF \geq I1 + I2 + k(TES+1) - 1, \text{ and}$$

$TES \geq 1$ (which is simply the minimum size of common extract of digital signatures)

The minimum value for k is kmin=2, otherwise there is of course no improvement to be expected in the search speed.

Finally, from this we deduce the minimum size value usable for TEF $$TEF\text{mini} = I1 + I2 + 2(TES+1) - 1$$

It will be noted that for TES=1, TEF mini=I1+I2+3

The maximum value for k is obtained backwards by taking TES=1, then:

$$k\text{max} = \text{integer part of } [(TEF - I1 - I2 + 1)/2]$$

For any value of k lying between kmin and kmax, we deduce the size of the common extract of signatures TES which will condition the detection of a possible extract common to the files of size TEF:

$$TES \leq \text{integer part of } [(TEF - I1 - I2 + 1)/k] - 1$$

The formulae may be adapted to the particular case of "default" digital filters adjusted for an index ratio k, as was seen previously. It then suffices to replace I1 by (intervref× k)/2 and I2 by I1−1. We obtain the following relation between TEF, TES, k and intervref:

$$TEF \geq k(\text{intervref} + TES + 1) - 2$$

The minimum size value usable for TEF is obtained for k=2 and TES=1 and we deduce TEF mini=2·intervref+2

For TEF fixed, we deduce the span of licit values for the index ratio k:

$$k\text{min}=2 \leq k \leq k\text{max} = \text{integer part } [(TEF+2)/(\text{intervref}+2)]$$

For any value of k lying between kmin and kmax, we deduce the size of the common extract of signature TES which will condition the detection of a possible extract common to the files of size TEF:

$$TES \leq \text{integer part of } [(TEF+2)/k] - (\text{intervref}+1)$$

Thus, the detection of a common extract of files of size TEF may be obtained by comparing digital signatures using various values of index ratio k. For a determined value TEF, we deduce a span of usable values for k: from kmin to kmax. For each usable value of k, we then determine a value TES of maximum size of common extract of digital signatures which guarantees the detection of a common extract of files of size TEF.

We shall now examine how to choose the value of k (in the licit span kmin, kmax) to get the fastest search speed.

As indicated previously, for the application to a full text search engine, the search is done in two passes:
- the search for common extracts of digital signatures of size greater than or equal to TES, and
- for each common extract of digital signatures that is found, the targeted search for common extracts of files of size TEF from among the set of pairs of start positions of extracts of files in conjunction with the pair of start positions of the common extract of digital signatures.

For the evaluation of the number of comparison operations to be performed for the two search passes, the following simplifying hypotheses are adopted in a first approach:
- the probabilities of drawing the data of files are independent;
- moreover, the probabilities of drawing the data of digital signatures are independent.

The probability of drawing a common extract of files of size 1 is denoted PF. The probability of drawing a common extract of files of size 2 is denoted PF2. Finally, the probability of drawing a common extract of files of size TEF is PFTEF.

Subsequently, the probability of drawing a common extract of digital signatures of size 1 is denoted PS. The probability of drawing a common extract of digital signatures of size 2 is PS2. The probability of drawing an extract of size TES is PSTES.

Moreover the following notation is adopted:
TF1: size of the first file to be compared
TF2: size of the second file to be compared with the first file
TS1: size of the digital signature associated with the first file
TS2: size of the digital signature associated with the second file We firstly evaluate the number Total1 of comparisons to be performed for the first step of "coarse" searching for common extracts of digital signatures of size greater than or equal to TES. The number of possible pairs of start positions of common extract of digital signatures is equal to $TS1 \times TS2$. For a value of index ratio k, the sizes TS1 and TS2 are deduced from the sizes TF1 and TF2 through the relations:

$$TS1=TF1/k \text{ and } TS2=TF2/k$$

For each possible pair of start positions of common extract of digital signatures, we compare first data of an extract. In case of correlation, the comparison is continued with second data of an extract, and so and so forth until the requested size of extract TES is attained.

For each test, the mean number of comparison operations is obtained from the probability of drawing PS, with:
For the test of the first data of an extract: 1 operation,
For the test of the second data of an extract: PS operations,
For the test of the TESth data of an extract: $PS^{TES-1}$ operations.

In total, we therefore obtain $1+PS+ \ldots +PS^{TES-1}$, i.e. $(1-PS^{TES})/(1-PS)$ operations. The value of Total1 is deduced therefrom by multiplication by $(TS1 \times TS2)$, i.e.:

$$Total1=(TF1 \times TF2) \times (1-PS^{TES})/(k^2 \times (1-PS))$$

We now evaluate the number Total2 of comparisons to be performed for the second step of "targeted" searching for common extracts of the files of size TEF from among the set of pairs of start positions of extracts of files in conjunction with the digital signatures common extracts found in the previous step of coarse searching. For a digital signatures common extract labeled by a pair of start addresses (n1, n2), the start addresses to be tested on the first file lie between $(k \cdot n1+I2+k \cdot TES-TEF)$ and $(k \cdot n1-I1)$, i.e. in total, $Na=(TEF-I1-I2-k \cdot TES+1)$ possible addresses (FIGS. 16A and 16B).

The value of TEF may moreover be bracketed by the following relation when the largest possible value for k is used:

$$I1+I2+k(TES+1)-1 \leq TEF < I1+I2+k(TES+2)-1$$

From this we deduce that $k \leq Na < 2k$.

The same reasoning applies to the start addresses to be tested on the second file by substituting n2 for n1.

There are therefore a total of $Na^2$ pairs of start positions of common extracts of files to be evaluated. The mean number of comparisons to be performed to search for a common extract of files of size TEF is obtained from the probability of drawing PS but by applying analogous reasoning to that of the coarse search step:

$$Na^2 \times (1-PF^{TEF})/(1-PF)$$

The mean number of digital signatures common extracts found in the first step is obtained from the probability of drawing PS and the sizes of the signatures TS1 and TS2:

$$TS1 \times TS2 \times PS^{TES}$$

We replace TS1 by TF1/k and TS2 by TF2/k and we finally obtain Total2 by product of the latter expressions:

$$Total2=(TF1 \times TF2) \times (Na^2/k^2) \times PS^{TES} \times (1-PF^{TEF})/(1-PF)$$

We have already shown that $1 \leq Na/k < 2$. From this we deduce the following relations:

$$Total2 \geq (TF1 \times TF2) \times PS^{TES} \times (1-PF^{TEF})/(1-PF) \text{ and}$$

$$Total2 < 4 \times (TF1 \times TF2) \times PS^{TES} \times (1-PF^{TEF})/(1-PF)$$

It is indicated that the sign "×" signifies here "multiplied by".

Finally, the evaluation of the number Total3 of comparison operations to be performed for the two search passes is obtained by simple addition of Total1 and of Total2, i.e.:

$$Total3=(TF1 \times TF2) \times (1-PS^{TES})/(k^2(1-PS))+(TF1 \times TF2) \times (Na/k)^2 \times PS^{TES} \times (1-PF^{TEF})/(1-PF)$$

For large values of TEF and TES, the relation may be approximated by:

$$Total3=(TF1 \times TF2) \times [(1/(k^2 \times (1-PS)))+((Na/k)^2 \times PS^{TES}/(1-PF))]$$

The total number of comparisons to be performed with the reference search algorithm is close to $TF1 \times TF2$. The ratio between the latter number and Total3 gives an estimate of the search speed gain obtained by using the algorithm within the meaning of the invention:

$$Gain=1/[(1/(k^2 \times (1-PS)))+((Na/k)^2 \times PS^{TES}/(1-PF))]$$

When the second term of the sum is less than the term in $1/k^2$, it will be noted that a gain of greater than $k^2/2(1-PS)$ is obtained.

It is indicated incidentally that, however, to obtain the effective gain in search speed, it is also necessary to deduce the actual times for calculating the digital signatures.

As will be seen with reference to FIG. 17, the study of the variations of the function Total3 as a function of the index ratio k shows that:
the first term of the sum in $1/k^2$ decays very rapidly as k increases, the second term of the sum in $PS^{IES(k)}$, grows as k increases, since the value of TES(k) decays as k increases.

It is recalled that in the general case, TES=integer part of $[(TEF-I1-I2+2)/k]-1$ In the case of optimized mean value digital filters, $$TES = \text{integer part of } [(TEF+2)/k]-(intervref+1)$$

It is apparent that the value of k to be used to obtain the minimum value of this function cannot be determined through a simple mathematical relation. However, as the set of possible values of k is reduced, the optimal value of k is determined empirically. For each possible value of k (between kmin and kmax), we calculate the value of Total3 as a function of k and we retain the value of k which produces the smallest value of Total3.

However, the evaluation of the number of comparison operations to be performed is more accurate if we also correct the model used for the calculation of the probabilities of drawing common extracts of digital signatures. Specifically, the probabilities of drawing the data of digital signatures are not mutually independent, since there is a sizeable overlap between the span of the file data which are used for the calculation of a digital signature data item of address (n/k) and that of the file data which are used for the calculation of the next data item of a digital signature of address (n/k)+1.

In the general case of a low-pass digital filter with (I1+I2+1) coefficients, the fuzzy states taken by the digital signature data of addresses (n/k) and ((n/k)+j) will be independent if there is no overlap between the spans of file data which are used for their determination. This condition is satisfied if $(n+I2+k-1)<(n+k\cdot j-I1-k+1)$, i.e. if $j>(I1+I2+2k-2)/k$.

In the particular case of the default digital filters adjusted for an index ratio k, we simply substitute (k×intervref−1) for (I1+I2) in the above equation. The condition of independence is then satisfied if $j>(intervref+2)-3/k$, stated otherwise, if the discrepancy in addresses between the digital signatures data equals at least (intervref+2).

To take account of the dependency of the fuzzy states taken by consecutive data of a digital signature, the probabilities model is modified as indicated below.

The probability of drawing a common extract of digital signatures of size 1, independent is denoted PSI. The probability of drawing a common extract of digital signatures of size 2 is equal to the probability of drawing PSI an extract of size 1, multiplied by the conditional probability of drawing PSD (D standing for dependent) another extract of size 1 following consecutively a previously found extract of size 1. This probability of drawing then becomes PSI×PSD. The probability of drawing a common extract of digital signatures of size 3 becomes $PSI \times PSD^2$. Finally, the probability of drawing an extract of size TES becomes $PSI \times PSD^{(IES-1)}$. The following relation may be demonstrated between PSI and PSD: $PSD^{(intervref+2)} < PSI$ On the basis of this new model of probabilities, we re-evaluate the formulae for calculating the numbers Total1 and Total2:

$$Total1 = [(TF1 \times TF2)/k^2] \times [1+(PSI \times (1-PSD^{(TES-1)})/(1-PSD))]$$

$$Total2 = (TF1 \times TF2) \times (Na/k)^2 \times PSI \times PSD^{(IES-1)} \times (1-PF^{TEF})/(1-PF)$$

For high values of TEF and TES, the formulae may be approximated as follows:

$$Total1 = [(TF1 \times TF2)/k^2] \times [1+(PSI/(1-PSD))]$$

$$Total2 = (TF1 \times TF2) \times (Na/k)^2 \times PSI \times PSD^{(IES-1)}/(1-PF)$$

And $Total3 = (TF1 \times TF2) \times [(1+(PSI/(1-PSD))/k^2 + (Na/k)^2 \times PSI \times PSD^{(IES-1)}/(1-PF)]$ In a preferred embodiment, the values of PSI and PSD are determined in advance by statistical analysis of the results of comparisons between digital signatures obtained with files of large size. For this purpose, a specific statistical analysis program standardizes the values to be used for PSI and PSD.

For the set of 4 default digital filters (FIG. 15) adjusted for an index ratio k, the values logged for PSI and PSD vary little as a function of k. The embodiment uses the following rounded values: PSI=0.4 and PSD=0.6

Represented in FIG. 17 are the variations in Total1, Total2 and Total3 as a function of k with the set of default digital filters and for a value of minimum size of common extracts of files to be found equal to 1000 and sizes of files to be compared of 100 kilobytes.

We now describe the improvement in the selectivity of the search for common extracts of digital signatures, still for a full text search engine.

In the simple case where the digital signatures data each carry only a single fuzzy logic state, the probability PSI of detecting a common extract of digital signatures of size 1 can be deduced from the probabilities of drawing the states "0", "1" and "?".

We denote by P0 the probability of drawing the state 0, by P1 that of the state 1 and by P? that of the state ?.

For a given pair of start positions of extracts of digital signatures to be evaluated, the conditions for detecting a common extract of digital signatures of size 1 are as follows:

- if the state of the digital signature data item associated with the first file equals 0, it is necessary for the state of the digital signature data item associated with the second file to be equal to 0 or to ?,
- if the state of the digital signature data item associated with the first file equals 1, it is necessary for the state of the digital signature data item associated with the second file to be equal to 1 or to ?,
- if the state of the digital signature data item associated with the first file equals ?, the state of the digital signature data item associated with the second file may take any value 0, 1 or ?

For a given pair of start positions of extracts of digital signatures to be evaluated, the probabilities of detecting a common extract of digital signatures of size 1 are determined as follows for each situation presented above:

- the state of the digital signature data item associated with the first file equals 0 and the state of the digital signature data item associated with the second file equals 0 or ? (probability=P0×(P0+P?))
- the state of the digital signature data item associated with the first file equals 1 and the state of the digital signature data item associated with the second file equals 1 or ? (probability=P1×(P1+P?))
- the state of the digital signature data item associated with the first file equals ? and the state of the digital signature data item associated with the second file takes any value (probability=P?×1=P?).

The probability of detection PSI is obtained by addition of the probabilities of each situation:

$$PSI = P0 \times (P0+P?) + P1 \times (P1+P?) + P?$$

The formula for determining PSI may again be simplified by replacing (P0+P?) by (1−P1), (P1+P?) by (1−P0), and (P0+P1+P?) by 1, and:

$$PSI = P0 \times (1-P1) + P1 \times (1-P0) + P? = 1 - 2 \times P0 \times P1$$

The maximum value of PSI equals 1. It is obtained for P0=0 or P1=0. This situation is to be proscribed, since, in this case, the search for common extracts of digital signatures has no selectivity.

The minimum value of PSI equals ½. It is obtained for P?=0 and P0=P1=½. This situation is ideal and may be approximated if we use a default adjusted digital filter with high values for the parameters intervref and interv, as was seen above.

For mean value digital filters, the value of PSI is obtained statistically by analyzing the intercomparison of digital signatures of large size. It has been shown that the application of an ideal filter of cutoff Fe/2(k−1) is conveyed by probabilities P0=P1=¼ and P?=½. It follows that PSI=⅞.

We therefore use digital filters that are more selective so that PSI<⅞, in a preferential embodiment.

In the general case where the digital signatures data each carry 4 fuzzy logic states (supplementary state "X" (prohibited)), the probability PSI of detecting a common extract of digital signatures of size 1 is evaluated on the basis of the previous results. We denote by PSI1 the probability of detecting a common extract of digital signatures of size 1 based only on a comparison of the states taken by the first law for determining fuzzy states. We denote by PS2, PS3 and PS4 the analogous detection probabilities associated with the following laws for determining fuzzy states (law 1, law 2, law 3 and law 4). If the laws are mutually independent, PSI=PSI1×PSI2×PSI3×PSI4. In practice, there is a dependence between the laws and the value of PSI obtained by statistical analysis is greater than the previous product.

Thus, the determination of each fuzzy state of a digital signature is performed by a prior calculation of a set of k consecutive binary states. In the case of a search for common extracts of files, it will be remarked that the detection of a possible common extract between the files will always be guaranteed if:

each digital signature data item of address (n1/k) associated with the first file is determined by intercomparing k consecutive binary states of addresses n1, n1+1, . . . , n1+k−1, and each digital signature data item of address (n2/k) associated with the second file is determined by simply copying the binary state calculated for address n2.

It is indicated indeed that, in a preferred embodiment, a digital signature carrying fuzzy states (0, 1 or ?) (first file) is in fact intercompared with a digital signature carrying only binary states (0 or 1) (second file). It is shown below that the selectivity of the search is thereby improved, since the probabilities of detecting extracts common to the digital signatures are simply decreased.

For a given pair of start positions of extracts of digital signatures to be evaluated, the conditions for detecting a common extract of digital signatures of size 1 are as follows:

if the state of the digital signature data item associated with the first file equals 0, it is necessary for the state of the digital signature data item associated with the second file to be equal to 0, if the state of the digital signature data item associated with the first file equals 1, it is necessary for the state of the digital signature data item associated with the second file to be equal to 1, if the state of the digital signature data item associated with the first file equals ?, the state of the digital signature data item associated with the second file may take any value 0, 1.

We take as notation P0' and P1' for the probabilities of drawing the binary states carried by the digital signature data items associated with the second file. We have the following relations:

$$P0'+P1'=1$$

$$P0 \leq P0' \leq P0+P?$$

$$P1 \leq P1' \leq P1+P?$$

For a given pair of start positions of extracts of digital signatures to be evaluated, the probabilities of detecting a common extract of digital signatures of size 1 are determined as follows for each situation presented above:

the state of the digital signature data item associated with the first file equals 0 and the state of the digital signature data item associated with the second file equals 0 (probability=P0×P0'), the state of the digital signature data item associated with the first file equals 1 and the state of the digital signature data item associated with the second file equals 1 (probability=P1×P1'), the state of the digital signature data item associated with the first file equals ? and the state of the digital signature data item associated with the second file takes any value (probability=P?×1=P?).

The probability of detection PSI' is obtained by addition of the probabilities of each situation:

$$PSI'=P0 \times P0'+P1 \times P1'+P?$$

$$\leq P0 \times (P0+P?)+P1 \times (P1+P?)+P?$$

$$\leq PSI$$

The relation PSI'≦PSI therefore implies an improvement in the selectivity of the search by carrying out the comparison between a signature carrying fuzzy states and a signature carrying only binary states.

It will be remarked that for a common extract of digital signatures that is labeled by a pair of start addresses (n1, n2), the start addresses to be tested on the files must take account of the use of a binary digital signature for the search. In the case where the fuzzy digital signature is calculated on the basis of the first file, the start addresses to be tested lie between (kxn1+I2+kxTES−TEF) and (kxn1−I1), i.e. in total:

$$Naf=(TEF-I1-I2-kxTES+1) \text{ possible addresses.}$$

In the case where the binary digital signature is calculated on the basis of the second file, the start addresses to be tested lie between:

$$(kxn2+I2+kx(TES-1)-(TEF-1)) \text{ and } (kxn2-I1), \text{ i.e. in total:}$$

$$Nab=(TEF-I1-I2-kx(TES-1)) \text{ possible addresses.}$$

For a default digital filter with parameter intervref, we obtain:

$$Naf=TEF-kxintervref-kxTES+2$$

$$Nab=TEF-kxintervref-kx(TES-1)+1$$

Described hereinbelow is a standardization of the probability laws associated with the digital filters. Logged in the array below are the probabilities PSI and PSD of mean value digital filters obtained by comparing two text files of large size (300 kilobytes).

| Variations of PSI and PSD as a function of interv for k = 30 and intervref = 14 | | | | | | | | |
|---|---|---|---|---|---|---|---|---|
| interv | 1 | 2 | 3 | 4 | 5 | 6 | 7 | Aggregate 2357 | Product2357 |
| PSI | | 0.773486 | 0.736862 | 0.721675 | 0.71152 | 0.707414 | 0.709985 | 0.430022 | 0.28792163 |
| PSD | | 0.791133 | 0.785281 | 0.788749 | 0.78712 | 0.782896 | 0.784331 | 0.561866 | 0.38354132 |

| Variations of PSI and PSD as a function of interv for k = 23 and intervref = 30 | | | | | | | | |
|---|---|---|---|---|---|---|---|---|
| interv | 1 | 2 | 3 | 4 | 5 | 6 | 7 | Aggregate 2357 | Product2357 |
| PSI | | 0.750849 | 0.711247 | 0.68624 | 0.67309 | 0.660956 | 0.652175 | 0.394079 | 0.23442846 |
| PSD | | 0.77943 | 0.781081 | 0.784095 | 0.79249 | 0.792396 | 0.796662 | 0.593634 | 0.38435208 |

| Variations of PSI and PSD as a function of interv for k = 30 and intervref = 30 | | | | | | | | |
|---|---|---|---|---|---|---|---|---|
| Interv | 1 | 2 | 3 | 4 | 5 | 6 | 7 | Aggregate 2357 | Product2357 |
| PSI | | 0.759058 | 0.714971 | 0.690597 | 0.67417 | 0.560454 | 0.653617 | 0.400642 | 0.23914252 |
| PSD | | 0.787054 | 0.784398 | 0.788614 | 0.79325 | 0.794868 | 0.799158 | 0.604817 | 0.39136461 |

| Variations of PSI and PSD as a function of k for aggregate2357 and intervref = 14 | | | | | | | | |
|---|---|---|---|---|---|---|---|---|
| k | 2 | 5 | 10 | 20 | 50 | 100 | 200 | 372 | 5880 |
| PSI | 0.325587 | 0.382557 | 0.412087 | 0.44424 | 0.443922 | 0.428286 | 0.42322 | 0.413466 | |
| PSD | 0.473232 | 0.528938 | 0.546894 | 0.57964 | 0.590101 | 0.581612 | 0.583971 | 0.627414 | |

It is noted that:
PSI is always less than PSD,
for k fixed, PSI decreases slightly as interv increases and PSD remains practically constant,
for k fixed, PSI decreases slightly as intervref increases.

The probabilities logged for the aggregate of 4 filters (interv=2, 3, 5, and 7) are greater than the product of the probabilities logged individually for each filter. It will therefore be understood that there is interdependency of the probabilities associated with each law.

To better approximate a situation of independency of the probabilities, it is possible to envisage proceeding as follows to adapt the realization of the functions for calculating the digital signature:

for law 1, we determine values taken by the samples $f_n$ by using a law for coding integers on the 8 bits of each data item, for law 2, we determine these values but after rotating the 8 bits by shifting by 2 bits, for law 3 we determine these values but after rotating the 8 bits by shifting by 4 bits, for law 4 we determine these values but after rotating the 8 bits by shifting by 6 bits.

for each law we use one and the same pair of parameters for the mean value digital filter, for example interv=4 and intervref=10.

For high values of TEF (and TES), the mathematical model for estimating the numbers of comparison operations to be performed for the search gives good results on the automatic determination of an optimal value of index ratio to be used.

For low values of TEF (and TES), the mathematical estimation model does not give good results, since the search processes are no longer allotted principally to comparison operations.

For each common extract of digital signatures that is found, a program triggers the call to a function for targeted searching for common extract of a file over a restricted span of pairs of start addresses on the files. With each call, the function carries out a certain number of tests of validity of the call parameters and of initialization of local variables. With each call, this function performs an operation of reading on each file of the data to be compared whose speed depends on the performance of the hard disk and the bus of the computer. To take account of the impact of these additional processing times, a further corrected mathematical model is used which adds, in the step of targeted searching for common extracts of a file, comparison operations in numbers that are representative of the call times of the targeted search function and of the reading times for the data to be compared. Typically, the number added to Total2 is of the form:

$$[((TF1 \times TF2)/k^2) \times PSI \times PSD^{(IES-1)}] \times [A \times B \times k],$$

where
A is a constant representative of the call times of the targeted search function, and
B is constant representative of the hard disk data read times.

The value of the parameters A and B depend on the characteristics of the computer used for the execution of the program and are determined empirically.

Described hereinbelow are the performance evaluation results with a 1 GHz Pentium III processor, with 128 Mb RAM, and 20 Gb hard disk used as computer for the evaluation (running under the Windows 98® operating system).

The performance was logged with the execution of a full text computer search program developed specifically in the C++ language. The program offers the choice of using a "conventional" algorithm or an algorithm within the meaning of the invention to perform a search for extracts common to the two files. The execution times of the algorithm within the meaning of the invention also integrate those for calculating the digital signatures.

In order to avoid falsifying the performance measurements, particular attention should be paid to the choice of files used to perform the searches. Specifically, in the course of tests it has transpired that the data files associated with everyday software such as Word®, Excel®, PowerPoint®, or the like have storage formats which lead to the existence of numerous consecutive data spans initialized to the same value 0 (0x00). As the size of these spans is of the order of several hundred data items, the probability model used for the embodiment of the prototype search program is falsified. Adaptations of this model may be investigated on a case by case basis, such as for example the ignoring in the targeted search function of the data value pair (0,0) as start position of a common extract.

The choice of the type of text file falls above all on text documents of large size in the HTML format. The search speed is expressed in millions of comparison operations per second (Mega ops/sec). The first file is of size: 213275 bytes and the second file of size: 145041 bytes. The array below shows the results obtained.

| Minimum size of the extracts to be found | 100 | 150 | 200 | 250 |
|---|---|---|---|---|
| Conventional algorithm ||||
| Mean search speed | 46.5 | 46.5 | 46.5 | 46.5 |
| Search time | 11 m 03.99 s | 11 m 03.99 s | 11 m 03.99 s | 11 m 03.99 s |
| Algorithm of the Invention ||||
| Mean search speed | 116.50 | 205.18 | 299.05 | 391.07 |
| Search time | 04 m 25.180 s | 02 m 30.500 s | 01 m 43.200 s | 01 m 18.870 s |
| Gain factor | 2.51 | 4.41 | 6.43 | 8.41 |

| Minimum size of the extracts to be found | 500 | 750 | 1000 | 1500 |
|---|---|---|---|---|
| Conventional algorithm ||||
| Mean search speed | 46.5 | 46.5 | 46.5 | 46.5 |
| Search time | 11 m 03.99 s | 11 m 03.99 s | 11 m 03.99 s | 11 m 03.99 s |
| Algorithm of the invention ||||
| Mean search speed | 1305.38 | 3051.29 | 4931.66 | 9711.95 |
| Search time | 0 m 23.560 s | 0 m 10.050 s | 0 m 06.200 s | 0 m 03.130 s |
| Gain factor | 28.07 | 65.62 | 106.06 | 208.86 |

| Minimum size of the extracts to be found | 2000 | 2500 | 5000 | 7500 |
|---|---|---|---|---|
| Conventional algorithm ||||
| Mean search speed | 46.5 | 46.5 | 46.5 | 46.5 |
| Search time | 11 m 03.99 s | 11 m 03.99 s | 11 m 03.99 s | 11 m 03.99 s |
| Algorithm of the invention ||||
| Mean search speed | 15740.0 | 21929.98 | 58334.07 | 101080.35 |
| Search time | 0 m 01.920 s | 0 m 01.370 s | 0 m 00.500 s | 0 m 00.280 s |
| Gain factor | 338.50 | 471.61 | 1254.50 | 2173.77 |

Other applications of searching for probable common extracts are now described. In certain areas of application, the criteria for detecting common extracts of files differ from the perfect identity of the extracts to be found. Such is the case in particular for data files representative of the digitization of a signal, such as for example audio files (with a .wav extension for example).

It is known that the value of the samples obtained will depend on the phase of the sampling clock. It is known moreover that the digitizing device introduces other errors into the values of the samples (noise, clock jitter, dynamic swing, or the like).

For these applications, the principle of the search algorithm within the meaning of the invention may be adapted so as to confine itself solely to the step of coarse searching between files. The steps envisaged may therefore be summarized as follows:

calculation of a digital signature per file to be compared, and comparison of the digital signatures with the search for common extracts of digital signatures.

In what follows we shall show how it is possible to define for oneself a criterion for detecting common extract with the aid of probabilities.

We showed previously, within the framework of the optimization of the value of the index ratio, that the number of comparison operations for searching between digital signatures is estimated at:

$$\text{Total1} = [(TF1 \times TF2)/k^2] \times [1 + PSI \times (1 - PSD^{(IES-1)})/(1 - PSD))]$$

We also showed that the probability of drawing a common extract of digital signatures equals $PSI \times PSD^{(IES-1)}$.

The probable number of common extracts of minimum size TEF which will be found by the intercomparison of two files of respective sizes TF1 and TF2 therefore becomes:

$$N = [(TF1 \times TF2)/k^2] \times PSI \times PSD^{(IES-1)}, \text{ with}$$

$$TES = \text{integer part of } [(TEF - I1 - I2 + 1)/k] - 1$$

The optimization of the value of k depends on the compromise between the search speed (inversely proportional to Total1) which grows as k increases (it is therefore beneficial to use high values for k) and the number N which grows as k increases (the value of k must therefore be lowered if one wishes to limit the number of probable common extracts detected).

The optimization of the value of k is done by fixing in advance a target value Nc for N and a value of minimum size of extract to be found TEF. On the basis of these parameters, the value of N is evaluated for all the permitted values of k and the value of k which makes it possible to best approximate the value Nc is retained.

This search procedure introduces an inaccuracy in the start positions of the probable common extracts found. In the case of a search for common extracts between a fuzzy signature and a binary signature (corresponding to a preferred embodiment), the inaccuracy in the start position of the probable common extract of files is of the order of +k or −k in the file associated with the fuzzy signature, and of the order of +k or −2k in the file associated with the binary signature.

The effective probability of detecting a common extract of digital signatures may be approximated by an analysis of the variations taken by the states of the extract on the fuzzy signature. Advantageously, the preferred embodiment evaluates a ceiling probability by detecting the number of transitions occurring between data in the 0 state and in the 1 state, thereby making it possible to filter from the search result the common extracts whose measured probability is greater than a predefined threshold, and thus to avoid perverting the statistical probability model (PSI×PSD$^{(IES-1)}$) used to optimize the search parameters.

In the case of audio files, the search for audio extracts common to two recording files may therefore be summarized as follows. We begin with a prior calculation of digital signatures associated with each file. On completion of this first step, we can regard a digital signature file as being a succession of logic states which characterize consecutive time spans of fixed duration of the audio signal. Typically, if one chooses a time span duration of one second for each digital signature data item, the processing of an audio file of an hour is conveyed by the creation of a file of digital signatures of 3600 data items (one per second). The first data item of the signature characterizes the first second of recording, the second data item the second, and so on and so forth.

The search for common audio extracts is then performed by intercomparing the data of digital signatures which were calculated on the basis of each audio recording. Any common extract is characterized by a pair of groups of N consecutive data of digital signatures (the first group of data items of signatures being associated with the first audio file and the second group being associated with the second audio file) and for which groups there is a compatibility between the N consecutive fuzzy logic states of the first group with the N consecutive fuzzy logic states of the second group.

The address of the first data item of the digital signature of the first group of G1 makes it possible to label the temporal position of the common extract in the first audio file. The address of the first data item of the digital signature of the second group G2 makes it possible to label the temporal position of the start of common extract in the second audio file. The number N (of consecutive data found in conjunction) makes it possible to deduce the duration of the extract found by simple multiplication with the duration of the time spans associated with each digital signature data item.

For example, assuming that digital signatures have been calculated on a first file audio1 of one hour and on a second file audio2 of one hour while fixing on a time span duration of 1 second per digital signature data item, in the case where the result of the search gives a common extract of digital signatures of 20 consecutive data items which is labeled by the address 100 in signature 1 and by the address 620 in signature 2, this search result would be conveyed by an audio common extract of a duration of 20 seconds, labeled by a start timing of 1 minute 40 seconds on the file audio1 and by a start timing of 10 minutes 20 seconds on the file audio2.

Contrary to the search for extracts by identicalness in text files, there are no other steps in the processing which makes it possible to remove the doubt as to the identification of the extracts which are logged in the step of comparing the digital signatures. The mathematical algorithm which is used for the calculation of the digital signatures guarantees that if there exists a common extract between the two audio files, a common extract will then be detected between the digital signatures. However, the reciprocal condition is false: there is a possibility of detecting common extracts of digital signatures which do not correspond to audio common extracts.

In order to have available a confidence index for the search results, the processing uses a probability model which makes it possible to calculate a false detections error rate. The model consists in calculating the probability of matching up a group of N consecutive data items of digital signatures which is representative of an audio extract with another group of N consecutive data items of digital signatures whose values are random and representative of a random audio signal.

The probability P(N) of detecting a common extract of N data of digital signatures is then expressed in a form P exp(N), P being the probability of drawing a common extract of size 1. In practice, and given the simultaneous use of several fuzzy logic states, P is less than ½ and P(N) is therefore bounded above by ½exp(N). Given that we can approximate $2^{10}$ by $10^3$, we easily deduce the probability of false detection of a common extract of N data items: $P(10)<10^{-3}$, $P(20)10^{-6}$, ....

To evaluate the probable number of false detections which will be associated with the comparison of two audio files, we have to multiply this value P(N) by the total number of pairs of start positions of extracts of digital signatures which is tested during the step of comparing the digital signatures. If we take S1 as notation for the number of data items of digital signatures of the file audio1 and S2 for the file audio2, the probable number of false detections becomes P(N)×S1×S2.

As indicated above, this number is divided by 2, each time that the size of the digital signatures common extracts searched for is increased by 1 (and divided by 1000 if the size is increased by 10).

To hone the algorithm for detecting musical extracts, the minimum size of common extract of signatures has been adjusted to 50 data items, thereby guaranteeing a false detection probability of less than $10^{-15}$. This choice takes account of the non-randomness of the audio signals processed, which in the case of music comprise numerous repetitive spans (refrains, and the like). This size may of course be adapted as required by other applications, either to increase or to decrease the acceptable error rate.

On the basis of this minimum size of extract, the program determines, backwards, the minimum duration of the extracts to be searched for as a function of the value of duration associated with each data item of the signature (the inverse of the frequency of the signature data).

For a digital signature frequency of 25 Hz (25 data items per second), the program makes it possible to search for audio extracts of a minimum duration of 2 seconds (50×1/25 s). For a digital signature frequency of 5 Hz (5 data items per second), the program makes it possible to search for audio extracts of a minimum duration of 10 seconds (50×⅕ s). For a digital signature frequency of 1 Hz (1 data item per second), the program makes it possible to search for audio extracts of a minimum duration of 50 seconds.

In practice, it is the application which fixes the threshold value of minimum duration of audio extract to be search for. For applications in the monitoring of advertising, the requirement is to detect extracts of television or radio spots of 5 s. For applications in the recognition of musical titles, the requirement is to detect extracts of the order of 15 s. For applications in the recognition of television programs (films, series, etc), the requirement is to detect extracts of the order of a minute.

It is indicated moreover that in the application to audio, video, or other files, where the first and second files are files of samples of digitized signals, the method within the meaning of the invention advantageously comprises a step of pre-processing of the data, for example by subband filtering, and a taking into account of the data associated with signal portions of higher level than a noise reference, so as to limit the effects of different equalizations between the first and second files.

Moreover, the method advantageously provides for a step of consolidating the search results, preferably by adjusting relative sizes of the packets of the first and second files, in such a way as to tolerate a discrepancy in respective speeds of retrieval of the first and second files.

Finally, it is indicated that one at least of the first and second files may be, in this application, a data stream, and the method of searching for common extracts is then executed in real time.

A specific program, written in the C++ language, is being developed to perform the search for common extracts with microcomputers equipped with a 32-bit Windows operating system. It proposes to select two files to be compared, to define the minimum size of the common extracts to be found therein, and then to instigate the search.

When the search is instigated, the program advantageously displays an execution monitoring window. This window indicates the time elapsed since the start of the search and estimations of the total duration and of the speed of search. It also makes it possible to abandon the search if it transpires that its duration is deemed to be too long. The search is interrupted as soon as a common extract has been found. The size of the extract found and its position in each file are then displayed. The program performs the analysis of the files following a predefined order. The principle is to test each pair of start positions that may be taken by a common extract in the files.

Its implementation is described in the presentations hereinbelow of the search algorithms. It is indicated that the search may be resumed so as to find other extracts common to the files. In this case, the search is resumed from the pair of start positions of the last common extract found and following the predefined order of analysis of the files. The search is stopped when the files have been analyzed completely. The stopping conditions are then displayed so as to indicate as appropriate that there is no extract common to the files or that there is no other extract common to the files.

The program proposes to use by choice two algorithms to perform searches: a conventional search algorithm and an algorithm within the meaning of the invention.

The program thus makes it possible to compare on one and the same microcomputer the performance of the two algorithms, and to do so for any search configuration, in terms of minimum size of the common extracts to be searched for, of size of the files, of nature of the files, or the like.

The performance evaluation criterion is the swiftness of execution of the algorithms. The execution monitoring windows make it possible to recover the estimations such as the duration of execution to accomplish the search, the search speed, and the like.

It emerges with the conventional algorithm that the search speed is practically constant and does not depend on the minimum size of the common extracts to be found. It is expressed as a number of operations of comparison of binary data (bytes) per second which are performed by the computer. Its value is always less than the clock frequency of the microprocessor.

On the other hand, with the algorithm within the meaning of the invention, the search speed varies as a function of the minimum size of the common extracts to be found. It is expressed by an estimation of the number of operations of comparison of binary data (bytes) per second which would be performed by the computer if the conventional algorithm were used. Thus, the more the minimum size of the common extracts to be found increases, the more the speed increases. Its value may exceed that of the clock frequency of the microprocessor.

Represented in FIG. 19A is a screen copy of a dialog box within the framework of a man machine interface of a computer program within the meaning of the invention, for a search, based on identicalness, for common extracts between two text files. FIG. 19D represents a screen copy indicating the progress of the search defined on the screen page of FIG. 19A. It will be noted that the time taken by this search is two seconds, whilst the sizes of the files were respectively 85390 bytes and 213275 bytes (FIG. 19A).

Represented in FIG. 19C is a screen copy for a search for common extracts between two audio files, in the .WAV format. As indicated above, this is preferentially a search which is not based on identicalness, but whose parameters (from which there stems in particular the confidence index described above) are determined in this dialog box (upper part of FIG. 19C). Here, a one hour radio recording (103.9 MHz in FM in Paris), on the one hand, and a base of 244 sound recordings (music, advertising spots, etc), on the other hand, are available. The search has detected 83 common extracts of the base in the radio recording.

Figure 19D:
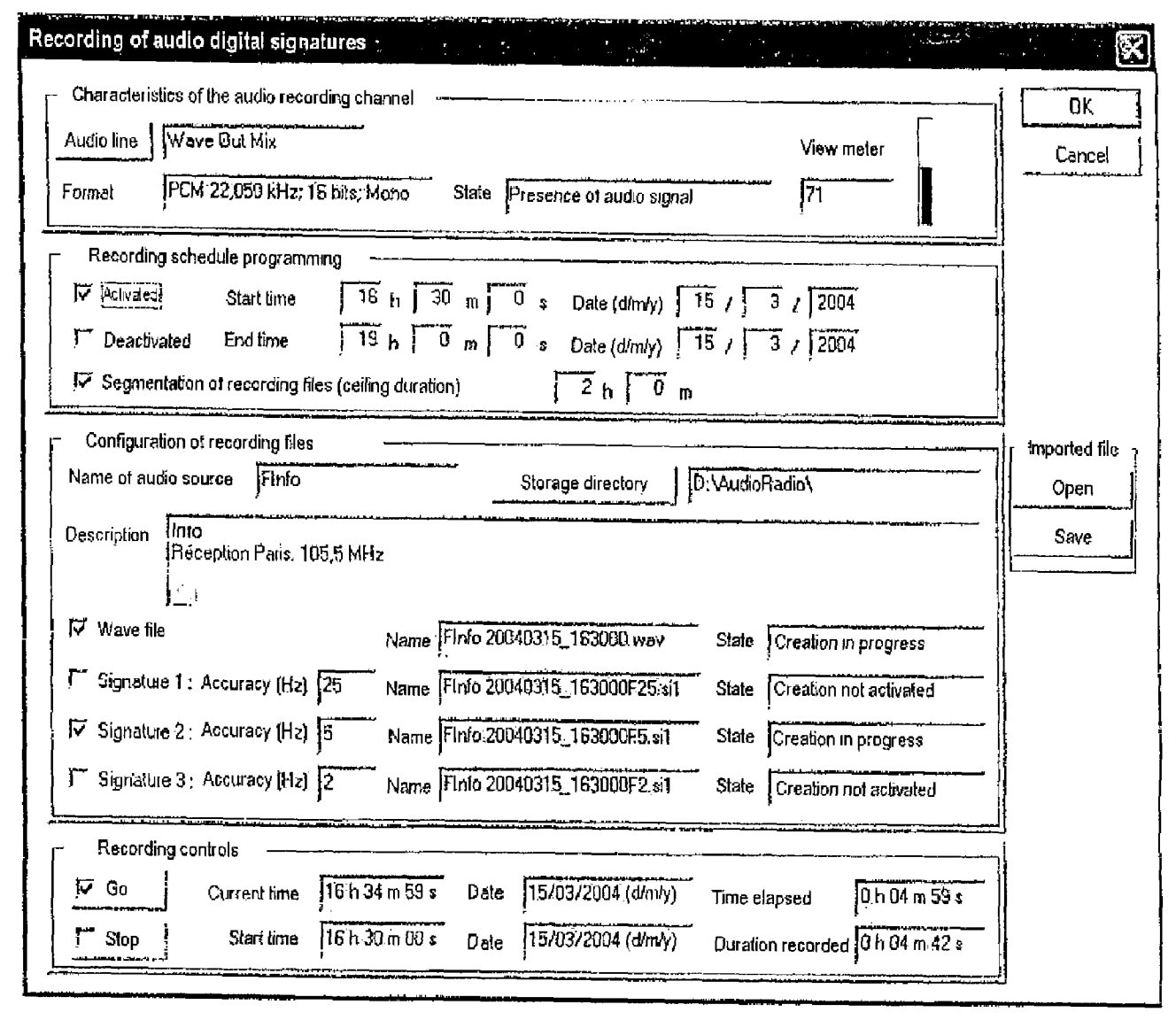

FIG. 19D finally represents a screen copy for the creation of a digital signature file formulated on the basis of a real-time processing of audio signals, corresponding to a radio recording (105.5 MHz in Paris) of two hours duration, at a sampling frequency of 22.050 kHz. It is indicated that the accuracy of the signature (here chosen at 5 Hz, out of a choice of 2, 5 or 25 Hz) corresponds to the number of data items in the digital signature, per second of piece of music. This parameter makes it possible in particular to hone the accuracy of the instant of start of detection of common extracts.

Represented in FIG. 18 is the context of another application of the present invention, in particular to the remote updating of one of the first and second files with respect to the other of the first and second files. Provided for this purpose is a computer installation, comprising:

a first computer entity PC1 suitable for storing the first file,
a second computer entity PC2 suitable for storing the second file, and
means of communications COM between the first PC1 and second PC2 computer units.

One of the entities at least (PC1 and/or PC2) comprises a memory (respectively MEM1 and/or MEM2) suitable for storing the computer program product as described hereinabove, for the search for common extract between the first and second files.

In this regard, the present invention is also aimed at such an installation.

Here, the entity storing this computer program product is then capable of performing a remote update of one of the first and second files with respect to the other of the first and second files, while already comparing the first and second files. Thus, one of the entities may have altered a computer file through new entries of data or other modifications in a certain period (a week, a month, or the like). The other computer entity, which in this application, has to provide for the storage and regular updating of the files output by the first entity, receives these files.

Rather than completely transferring the files to be updated from the first entity to the second entity, the first entity labels by the method within the meaning of the invention the data extracts which are common between two versions of the same file, the new version which has been modified by adding or deleting data, and the old version which has been previously transmitted to the other entity and of which the first entity has kept a backup locally. This comparison within the meaning of the invention makes it possible to create a file of differences between the new version and the old version of the file which comprises information regarding the position and size of the common data extracts which may be used to partially reconstruct the new version of the file on the basis of the data of the old version of the file, and which comprises the data supplements which must be used to complete the reconstruction of the new version of the file. The updating of the file is then performed by carrying out a transmission of the file of differences to the second entity, then by thereafter applying a local processing to the second entity for reconstructing the new version of the file by combining the old version of the file and said file of differences.

The application of the method within the meaning of the invention makes it possible to considerably reduce the processing times necessary for generating said file of differences and makes it possible to reduce the volume of data to be transferred (and hence the transfer cost and time) to perform the remote updating of bulky computer files that have undergone only few modifications, in particular when such files comprise data relating to accounts, banking or the like.

The computer entities may take the form of any computing device (computer, server, or the like) comprising a memory for storing (at least momentarily) the first and second files, for the search for at least one common extract between the first file and the second file. They are then equipped with a memory also storing the instructions of a computer program product of the type described above. In this regard, the present invention is also aimed at such a computing device.

It is also aimed at a computer program product, intended to be stored in a memory of a central unit of a computer such as the aforesaid computing device or on a removable medium intended to cooperate with a reader of said central unit. This program product comprises instructions for conducting all or part of the steps of the processing within the meaning of the invention, described hereinabove.

The present invention is also aimed at a data structure intended to be used for a search of at least one extract common to a first and a second file, the data structure being representative of the first file, provided that this data structure is obtained by applying the processing within the meaning of the invention so as to form a digital signature. In particular, this data structure is obtained by implementing steps a) and b) of the method stated hereinabove and comprises a succession of addresses identifying addresses of the first file and to each of which is assigned a fuzzy logic state from among the states: "true" (1), "false" (0) and "undetermined" (?).

The invention claimed is:

1. A method implemented by computer means of searching content, for at least one extract common to a first file and to a second file, in the form of binary data, being searched for, wherein the method comprises:
   a prior preparation of the first file at least, comprising the following steps:
   a) segmenting the first file into a succession of data packets, of chosen size, and identifying addresses of packets in said file,
   b) associating with the address of each packet a digital signature defining a fuzzy logic state from among at least three states: "true", "false" and "undetermined", said signature resulting from a combinatorial calculation on data emanating from said file,
   and the search for common extract, itself, comprising the following steps:
   c) comparing the fuzzy logic states associated with each packet address of the first file, with fuzzy logic states determined on the basis of data emanating from the second file,
   d) eliminating from said search for common extract, pairs of respective addresses of the first and second files whose respective logic states are "true" and "false" or "false" and "true", and preserving the other pairs of addresses identifying data packets liable to comprise said common extract.

2. The method as claimed in claim 1, wherein, in step b), a data packet is assigned the state:
   "true" if all the data of the packet satisfy a first condition,
   "false" if all the data of the packet satisfy a second condition, contrary to the first condition,
   and "undetermined" if certain data of the packet satisfy the first condition, while other data of the packet satisfy the second condition.

3. The method as claimed in claim 1, wherein a processing prior to step b) is applied to the data of a file, said processing comprising the following steps:
   a1) the data of the file are considered as a string of samples obtained at a predetermined sampling frequency Fe, and of values coded according to a binary representation code, and
   a2) a digital filter is applied to said samples $f_n$, said filter being adapted to minimize a probability of obtaining the "undetermined" state for the digital signatures associated with the packets of samples.

4. The method as claimed in claim 3, wherein the application of said digital filter amounts to:
   applying a spectral transform to the sampled data,
   applying a low-pass filter to said spectral transform,
   and applying an inverse spectral transform after said low-pass filter.

5. The method as claimed in claim 4, wherein the low-pass filter operates on a frequency band comprising substantially the interval:

$$[-Fe/2(k-1), +Fe/2(k-1)],$$

where Fe is said sampling frequency,
and k is the number of samples that a packet comprises.

6. The method as claimed in claim 4, wherein said digital filter comprises a predetermined number of coefficients of like value, and wherein the frequency response of the associated low-pass filter is expressed, as a function of frequency f, by an expression of the type:

$$\sin(PI \cdot f \cdot T)/(PI \cdot f \cdot T),$$

where sin( ) is the sine function, and with:
PI=3.1416, and
T=(K−1)/Fe where K is said predetermined number of coefficients and Fe said sampling frequency.

7. The method as claimed in claim 6, wherein said predetermined number of coefficients of the filter (2K+1) is greater than or equal to 2k−1, where k is the number of samples that a packet comprises.

8. The method as claimed in claim 3, wherein:
   said digital filter is a mean value filter of a predetermined number (2K+1) of coefficients,
   the difference between two successive filtered samples $(r_{n+1}-r_n)$ is proportional to the difference between two unfiltered samples $(f_{n+K+1}-f_{n-K})$, respectively of a first rank and of a second rank, said ranks being spaced apart by said predetermined number of coefficients, and the calculation of said filtered samples is performed by utilizing this relation to reduce the number of calculation operations to be performed.

9. The method as claimed in claim 3, wherein:

the "true" state is assigned to the address of a packet if, for this packet, all the filtered samples have a value greater than a chosen reference value, the "false" state is assigned to the address of a packet if, for this packet, all the filtered samples have a value less than a chosen reference value, and the "undetermined" state is assigned to the address of a packet if, for this packet, the filtered samples have, for certain of them, a value less than said reference value, and, for other filtered samples, a value greater than said reference value.

10. The method as claimed in claim 9, wherein, for any filtered sample $r_n$ of given order n, said reference value Vref is calculated by averaging the values of the unfiltered samples $f_k$ over a chosen number of unfiltered consecutive samples Kref about an unfiltered sample $f_n$ of the same given order n.

11. The method as claimed in claim 10, wherein the values of the filtered samples are made relative, for comparison, to a zero threshold value, and wherein said filtered samples $r'_n$ are expressed by a sum of the type:

$$r'_n = K_{ref} \sum_{k=-(K/2)}^{(K/2)-1} f_{n+k} - K \sum_{k=-(K_{ref}/2)}^{(K_{ref}/2)-1} f_{n+k}, \quad \text{where:}$$

$f_{n+k}$ are unfiltered samples obtained in step a1),

K is the number of coefficients of the digital filter, preferably chosen to be even, and $K_{ref}$ is said number of unfiltered samples around an unfiltered sample $f_n$, preferably chosen to be even and greater than said number of coefficients K.

12. The method as claimed in claim 11, wherein said sum is applied to the unfiltered samples $f_n$ a plurality of times, according to a processing performed in parallel, while respectively varying the number of coefficients K.

13. The method as claimed in claim 3, wherein each filtered sample $r_n$ is expressed as a sum of the type:

$$r_n = \sum_{i=-I_1}^{I_2} filter_i \times f_{(n+i)}, \quad \text{where:}$$

$f_{(n+i)}$ are unfiltered samples, $filter_i$ are coefficients of a digital filter, integrating, as the case may be, a threshold value referred to zero, and wherein a number k of unfiltered samples that a packet comprises is chosen, at minimum equal to 2 and less than or equal to an expression of the type:

$(TEF-I_1-I_2+1)/2$, where TEF is a desired minimum size of the common extracts searched for.

14. The method as claimed in claim 13, wherein:

for a given value TEF of the desired minimum size of common extracts searched for, a span of usable values for said number k of unfiltered samples that a packet comprises is determined, and, for each usable value of the number k, an optimal size TES is determined of a succession of data of digital signatures, for which succession the detection of a common extract of size TEF is guaranteed, and wherein said optimal size TES is less than or equal to an expression of the type: $E[(TEF-I_1-I_2+1)/k]-1$, where $E(X)$ designates the integer part of X.

15. The method as claimed in claim 3, wherein the method comprises, for the first file:

the sampling at a chosen sampling frequency, the digital filtering corresponding to a low-pass filtering in the frequency space, and the combination of the filtered samples to obtain digital signatures in the "true", "false" or "undetermined" state, associated with the respective addresses of the first file, while the method comprises, for the second file:

the sampling at a chosen sampling frequency, the digital filtering corresponding to a low-pass filtering in the frequency space, and the logic state associated with each packet of filtered samples is determined on the basis of the logic state associated with a single filtered sample chosen born each packet, in such a way as to obtain digital signatures comprising only "true" or "false" logic states and thus to improve the selectivity of the comparison of the digital signatures.

16. The method as claimed in claim 15, wherein, if the logic state associated with an address of the first file is "true" or "undetermined", while the logic state associated with an address of the second file is "true", the pair of said addresses is retained born the search of common extract, if the logic state associated with an address of the first file is "false" or "undetermined", while the logic state associated with an address of the second file is "false", the pair of said addresses is retained for the search for common extract, while the other pairs of addresses are excluded born the search.

17. The method as claimed in claim 1, wherein the fuzzy states associated with the first file at least are each coded on at least two bits.

18. The method as claimed in claim 17, wherein the fuzzy states determined for a least number of coefficients K are coded on least significant bits and the fuzzy states determined for a larger number of coefficients K are coded on subsequent bits, up to a chosen total number of bits.

19. The method as claimed in claim 1, the two files to be compared comprising data representative of alphanumeric characters, and in particular representative of a text and/or a computer or a genetic code, wherein the method comprises:

a first group of steps comprising the formation of the digital signatures and their comparison, for a coarse search, and a second group of steps comprising an identicalness comparison in the spans of addresses satisfying the coarse comparison, and in that the data of a file are considered as a string of samples, with a chosen number k of samples per packet, and wherein the value of this chosen number k is optimized initially by searching for a minimum of comparison operations to be performed.

20. The method as claimed in claim 19, wherein, for the optimization of the chosen number k of samples per packet, account is taken of a total number:

of operations of comparison of digital signatures to be performed, and of operations of identicalness comparison of data to be performed thereafter, and wherein said total number of operations is a minimum for a finite set of numbers k.

21. The method as claimed in claim 19, wherein an information relating to a minimum desired size of common extracts searched for is obtained, and used to optimize said chosen number k of samples per packet, and wherein the optimal number k of samples per packet varies substantially as said minimum size so that the larger desired minimum size of common extracts searched for, the shorter the duration of the search for common extract.

22. The method as claimed in claim 1, wherein it comprises the search for common extracts consists of a single group of steps comprising the formation of the digital signatures and their comparison, and wherein the number of data items per packet is optimized by initially fixing a confidence index characterizing an acceptable threshold of probability of false detection of common extracts.

23. The method as claimed in claim 22, the first and second files being files of samples of digitized signals, wherein the method comprises a step of preprocessing of the data and a taking into account of the data associated with portions of signal of level greater than a noise reference.

24. The method as claimed in claim 22, the first and second files are files of samples of digitized signals, wherein the method provides for a step of consolidation of the search results, preferably by adjustment of relative sizes of the packets of the first and second files, in such a way as to tolerate a discrepancy in respective speeds of retrieval of the first and second files.

25. The method as claimed in claim 1, wherein one at least of the first and second files is a data stream, and wherein the method of searching for common extracts is executed in real time.

26. A computer program product, stored in a memory of a central unit of a computer or on a removable medium to cooperate with a reader of said central unit, the program comprising instructions for conducting steps for searching at least one extract common to a first file and to a second file, in the form of binary data, said steps comprising:

a prior preparation of the first file at least, including the following steps:

a) segmenting the first file into a succession of data packets, of chosen size, and identifying addresses of packets in said file, b) associating with the address of each packet a digital signature defining a fuzzy logic state from among at least three states: "true", "false" and "undetermined", said signature resulting from a combinatorial calculation on data emanating from said file, and the search for common extract, itself, including the following steps:

c) comparing the fuzzy logic states associated with each packet address of the first file, with fuzzy logic states determined on the basis of data emanating from the second file, d) eliminating from said search for common extract, pairs of respective addresses of the first and second files whose respective logic states are "true" and "false" or "false" and "true", and preserving the other pairs of addresses identifying data packets liable to comprise said common extract.

27. A computer device, comprising a memory for storing at least first and second files, for the search for at least one extract common to the first file and the second file, wherein it comprises a memory suitable for storing the instructions of a computer program product as claimed in claim 26.

28. A computer installation, comprising:

a first computer entity suitable for storing a first file, a second computer entity suitable for storing a second file, and means of communications between the first and second computer units, wherein at least one of said entities comprises a memory suitable for storing the computer program product as claimed in claim 26, for the search of extract common to the first and second files.

29. The installation as claimed in claim 28, wherein the entity storing the computer program product is designed to perform a remote update of one of the first and second files with respect to the other of the first and second files.

30. A data structure stored on a computer-readable storage medium used for a search of at least one extract common to a first and a second file, the data structure being representative of the first file, the data structure being obtained by the implementation of the following steps:

a) segmenting the first file into a succession of data packets of chosen size, and identifying addresses of packets in said file, b) associating with the address of each packet a digital signature defining a fuzzy logic state from among at least three states: "true", "false" and "undetermined", said signature resulting from a combinatorial calculation on data emanating from said file, the data structure thus comprising a succession of addresses identifying addresses of the first file, a fuzzy logic state from among the states: "true", "false" and "undetermined", being assigned to each of said addresses of the data structure, c) comparing the fuzzy logic states associated with each packet address of the first file, with fuzzy logic states determined on the basis of data emanating from the second file, d) eliminating from said search for common extract, pairs of respective addresses of the first and second files whose respective logic states are "true" and "false" or "false" and "true", and preserving the other pairs of addresses identifying data packets liable to comprise said common extract.

* * * * *